United States Patent [19]

Ozaki et al.

[11] Patent Number: 5,757,963
[45] Date of Patent: May 26, 1998

[54] METHOD AND APPARATUS FOR COMPLEX COLUMN SEGMENTATION BY MAJOR WHITE REGION PATTERN MATCHING

[75] Inventors: Masaharu Ozaki, Sunnyvale, Calif.; Mudita Jain, Tucson, Ariz.

[73] Assignees: Xerox Corporation, Stamford, Conn.; Fuji Xerox Co., Ltd., Tokyo, Japan

[21] Appl. No.: 483,765

[22] Filed: Jun. 7, 1995

Related U.S. Application Data

[63] Continuation-in-part of Ser. No. 315,875, Sep. 30, 1994, Pat. No. 5,555,556, and a continuation-in-part of Ser. No. 315,857, Sep. 30, 1994, Pat. No. 5,574,802.

[51] Int. Cl.$^6$ .................................................. G06K 9/62
[52] U.S. Cl. ...................... 382/209; 382/175; 382/176
[58] Field of Search ................................. 382/209, 192, 382/203, 224, 177, 173, 175, 176

[56] References Cited

U.S. PATENT DOCUMENTS

| | | | |
|---|---|---|---|
| 4,698,779 | 10/1987 | Holden et al. | 382/9 |
| 4,876,728 | 10/1989 | Roth | 382/21 |
| 4,887,302 | 12/1989 | Urushibata | 382/9 |
| 5,046,114 | 9/1991 | Zobel | 382/9 |
| 5,272,764 | 12/1993 | Bloomberg et al. | 382/9 |
| 5,335,298 | 8/1994 | Hevenor et al. | 382/9 |
| 5,444,797 | 8/1995 | Spitz et al. | 382/192 |

OTHER PUBLICATIONS

"Page Segmentation By White Streams", T. Pavlidis et al., First International Conference on Document Analysis and Recognition, Sep. 30–Oct 2, 1991, St. Malo, France.

"Page Segmentation and Classification", T. Pavlidis et al., CVGIP: Graphical Models and Image Processing, vol. 54, No. 6, Nov., pp. 484–496, 1992.

"Image Segmentation by Shape–Directed Covers", Baird et al., 10th Intl. Conference on Pattern Recog., Jun. 16–21, 1990, pp. 820–825.

"A Prototype Document Image Analysis System for Technical Journals", Nagy et al., Computer, Jul., 1992, pp. 10–21.

"Approximate Matching of Regular Expressions", E. Myers et al., Bulletin of Mathematical Biology, vol. 51, No. 1, 1989, pp. 5–37.

Primary Examiner—Jose L. Couso
Assistant Examiner—Anh Hong Do
Attorney, Agent, or Firm—Oliff & Berridge, PLC

[57] ABSTRACT

A system for logically segmenting document elements from a document includes an input port for inputting a signal representing the document image, a computer having a document structural model, a document white region extraction system that extracts major white regions separating document elements in the input document image, and a string translation device that generates matching one-dimensional data string that corresponds to the extracted major white regions in a document image, a comparison device that selects the optimum path through a finite state machine representing acceptable column layouts for the source document, and a columnar layout identification device that identifies the column layout defined by the optimum path. Then, the identified column of document elements may be processed to logically tag or extract document elements. The method for logically segmenting document element columns includes providing at least one structural model of a corresponding source document, each structural model including at least one finite state machine defining relationships between document elements of the source document. Identifying major white regions in the input document image segmenting and defining the document elements of the document image, and assembling a one-dimensional data string corresponding to the major white regions, generating at least one optimum path that matches the data string, and identifying the column layout of the input document image based on the optimum path.

2 Claims, 23 Drawing Sheets

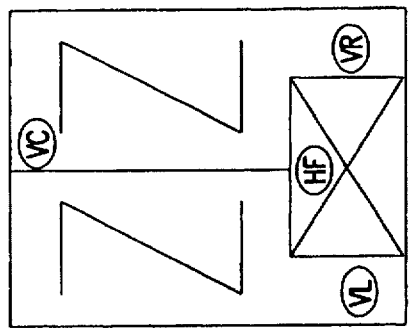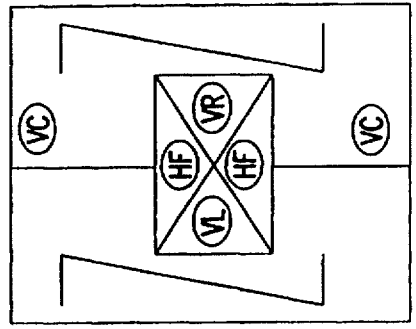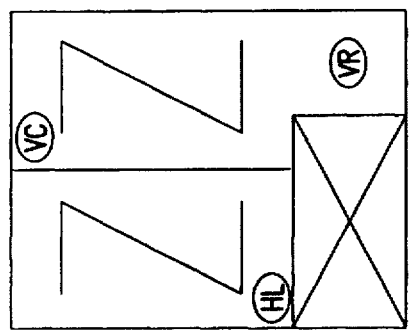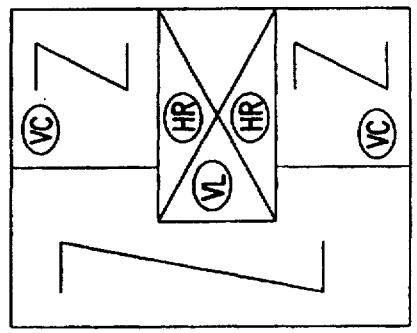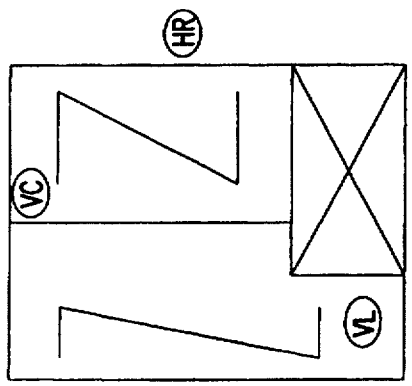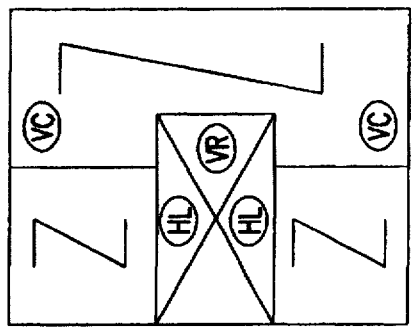

METHOD AND APPARATUS FOR COMPLEX COLUMN SEGMENTATION BY MAJOR WHITE REGION PATTERN MATCHING

Related Applications

This application is a continuation-in-part application of U.S. patent application Ser. No. 08/315,875 filed on Sep. 30, 1994, now U.S. Pat. No. 5,555,556, and titled "Method and Apparatus for Document Segmentation By Background Analysis," incorporated herein by reference, and a continuation-in-part application of U.S. patent application Ser. No. 08/315,857 filed on Sep. 30, 1994, now U.S. Pat. No. 5,574,802 and titled "Method and Apparatus for Document Element Classification By Analysis of Major White Region Geometry," incorporated herein by reference.

BACKGROUND OF THE INVENTION

1. Field of the Invention

This invention generally relates to a method and apparatus for extracting major white regions and for identifying a column of document elements from a complex column document image.

2. Background of Related Art

A method for segmenting text regions has been proposed in Baird et al., "Image Segmentation by Shape Directed Covers," 10th International Conference on Pattern Recognition, pp. 820–825, 16–21 Jun. 1990. Many document segmentation techniques, including Baird, assume that all elements in a document have a rectangular shape. This assumption is not necessarily true for many types of document layouts. Thus, one of the problems in segmentation is to segment elements with non-rectangular shapes. The method disclosed in Baird analyzes the white areas in a document image, but no previously known method analyzes the white areas in a document image and segments columns of document elements by extracting and analyzing major white regions. "White regions" are those areas of a document which contain no connected components, i.e. the background regions of the document.

The segmentation technique disclosed in parent application U.S. patent application Ser. No. 08/315,875 extracts major white regions in the input document image and non-rectangular shaped document elements by finding closed loops of major white regions in the document. However, as shown in FIG. 21, that document segmentation system will often extract a single document element as two or more separate document elements divided by structurally unimportant major white regions inadvertently identified in the image. As shown in FIG. 21, the document segmentation system described in U.S. patent application Ser. No. 08/315,875 misidentifies region A as a major white region. This causes the document segmentation system to improperly divide and extract the single document element C as document elements C-1 and C-2, respectively. The unnecessary major white regions located in the document image are formed because the segmentation system is not limited to acceptable or legal column layouts. To avoid such misrecognition problems, the segmentation system requires one or more definitions of acceptable column layouts to determine major white regions separating the document elements in the document image columns.

A structural model is a description of the specific column layouts that can occur in the source document. The structural model can be provided off-line by the users and in advance of the actual segmentation process or provided by the producers of the source document type.

Additionally, the document segmentation system described in U.S. patent application Ser. No. 08/315,875 is not necessarily loss-less when extracting the major white regions. That is, all of major white regions which are actually in the document are not extracted because of the fixed threshold values used by the segmentation system. As shown in FIG. 22, the segmentation system can fail to extract small but structurally important major white regions. For example, the small major white region E is not extracted, because its vertical height is less than the vertical threshold for vertically aligned major white regions. Thus, when the document elements are extracted, document elements F and G, which should be extracted as two separate document elements, are instead extracted as a single document element. Therefore, a segmenting system is needed which is able to approximately match the input major white regions against a structural model and avoid data loss.

E. Myers and W. Miller, "Approximate Matching of Regular Expressions," Bulletin of Mathematical Biology, Vol. 51, No. 1, pp. 5–37, 1989, (hereafter Myers), herein incorporated by reference, describes techniques for approximate regular expression matching. Given a sequence A and a regular expression R, a sequence matching R must be found whose optimal alignment with A is the highest scoring of all sequences. The solution can be in terms of the highest scoring alignment or the minimum-cost set of deletion, insertion, an substitution operations that convert A to a member of R. Myers presents several algorithms which find the optimum matching sequence in at least time $O(MN)$, where M and N are the lengths of A and R, respectively.

SUMMARY OF THE INVENTION

This invention provides a system for identifying document elements by analyzing only the white areas or background areas (non-text) in a document image.

This invention further provides an efficient and accurate document element segmentation apparatus and method, which compare the major white regions extracted from an input document image against a description of the allowable patterns of a columnar model document. The allowable columnar images can include the union of several rectangular document elements, and may therefore be non-rectangular. The document element segmenting system then segments the document elements into columns from the input document image based on the major white region pattern. The major white region pattern is based upon the major white region types, sequences, and intersections.

Regular expressions, which are based on the major white region intersections, are used to pre-define the allowable structure or patterns of the major white regions separating the columns in the document image. After the major white regions are extracted from the document image in both the horizontal and the vertical directions, approximate regular expression matching compares the major white regions against a finite state machine (or an automaton) to determine the set or pattern of major white regions that separate the columns. The document element segmentation system uses approximate matching techniques, and is therefore able to output the closest matches to the desired pattern of major white regions to handle the data loss and misrecognition.

Once segmented into columns, the input document image document elements can be further processed. For example, logical tags associated with the document elements of the matching column structure, based on the comparison to the input document image, are associated with the corresponding document elements of the document image to logically identify the document elements. Alternatively, the segmented document elements can be extracted and processed by an optical character recognition unit or output to a printer for printing.

Using this invention, it is not necessary to analyze portions of a document image containing document elements to determine which connected components form a coherent group, i.e., a document element. An image on a document is scanned to create an electronic or digital representation of the document image, i.e. an input document image. Major white regions are rectangular areas of "white space" having a predetermined minimum size. It should be appreciated that the term "white space" refers to the background, non-image areas or non-text areas of the document image. Since documents are usually black or color images on a white background, these background areas are referred to as "white space." However, it should also be appreciated that if the document image is on a colored background, or incorporates white text on a black or colored background, these non-image colored or black background areas are still "white spaces" for the purposes of this invention.

Document elements are areas containing information such as headings, text, graphics, etc., which are separated from one another by the major white regions. Areas containing document elements and separated from other areas containing document elements by a predetermined major white region size are assumed to be separate document elements.

Other objects and advantages of this invention will become apparent from the following detailed description taken in conjunction with the annexed drawings, which disclose preferred embodiments of the invention.

BRIEF DESCRIPTION OF THE DRAWINGS

The preferred embodiments of this invention will be described in detail with reference to the drawings, in which:

FIGS. 12A-12L show sample documents showing the types of major white regions corresponding to transitions between states of the finite state machine of FIG. 11;

DESCRIPTION OF THE PREFERRED EMBODIMENT

Figure 1:
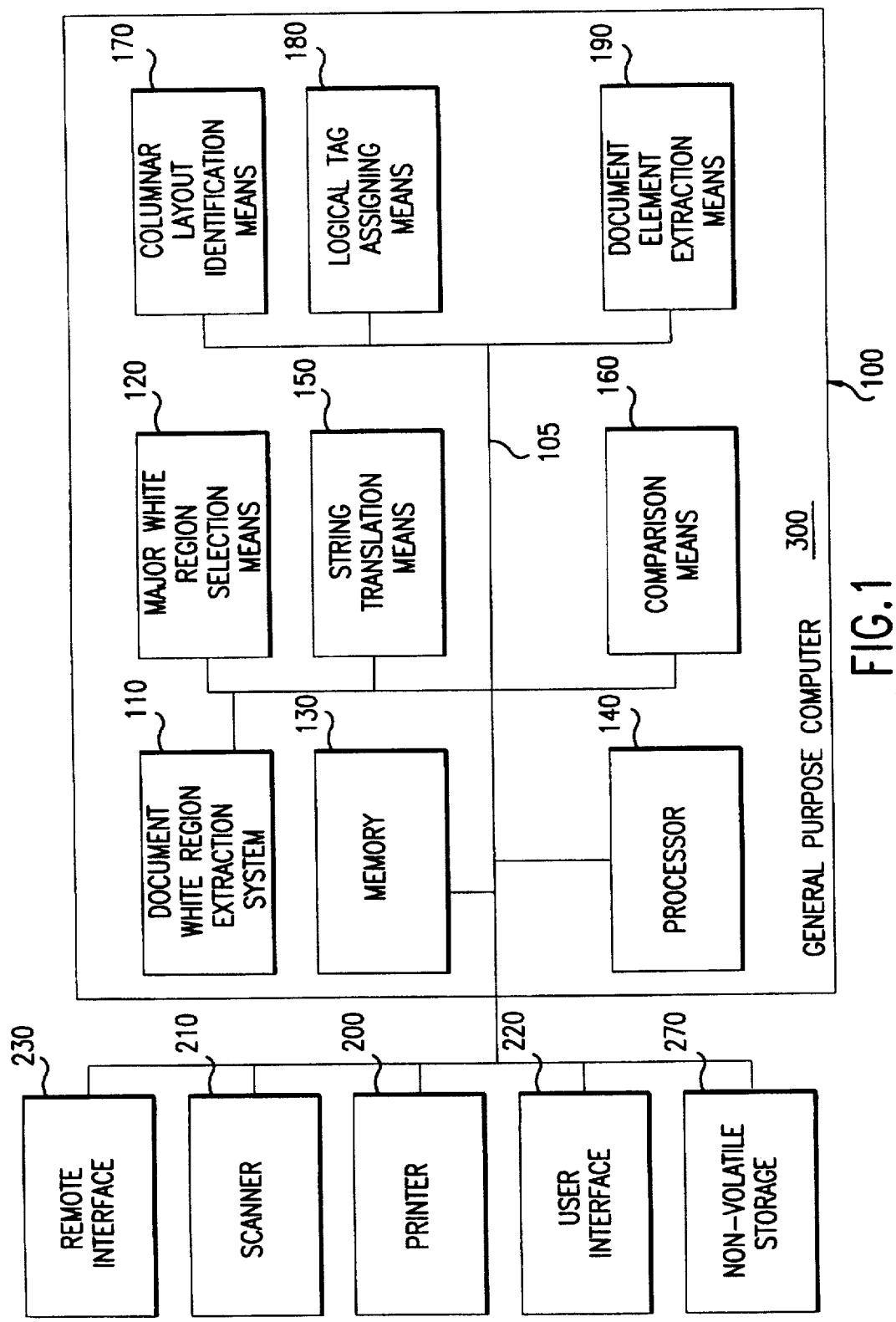
FIG. 1 is a block diagram of a preferred embodiment of the document element segmentation system.

FIG. 1 shows one preferred embodiment of a document element segmentation system 100. The document element segmentation system 100 includes a document white region extraction system 110, a major white region selecting means 120, a memory 130, a processor 140, an string translation means 150, a comparison means 160, a columnar layout identification means 170, a logical tag assigning means 180, and a document element extraction means 190, which are all connected together by a bus means 105. In addition, one or more of a printer 200, a scanner 210, a user interface 220, a remote interface 230, and a non-volatile memory 270 can be connected to the bus means 105. The remote interface can be connected to a LAN, a wide area network (WAN), another computer, or the like. As shown in FIG. 1, the document element segmentation system 100 is preferably implemented on a general purpose computer 300. However, the document element identification system 100 can also be implemented on a special purpose computer, a programmed microprocessor or microcontroller, an ASIC or other integrated circuit, a programmable logic device, such as a PLD, PLA, PAL or the like, a hardwired electronic circuit such as a discrete element circuit, or the like.

Figure 2:
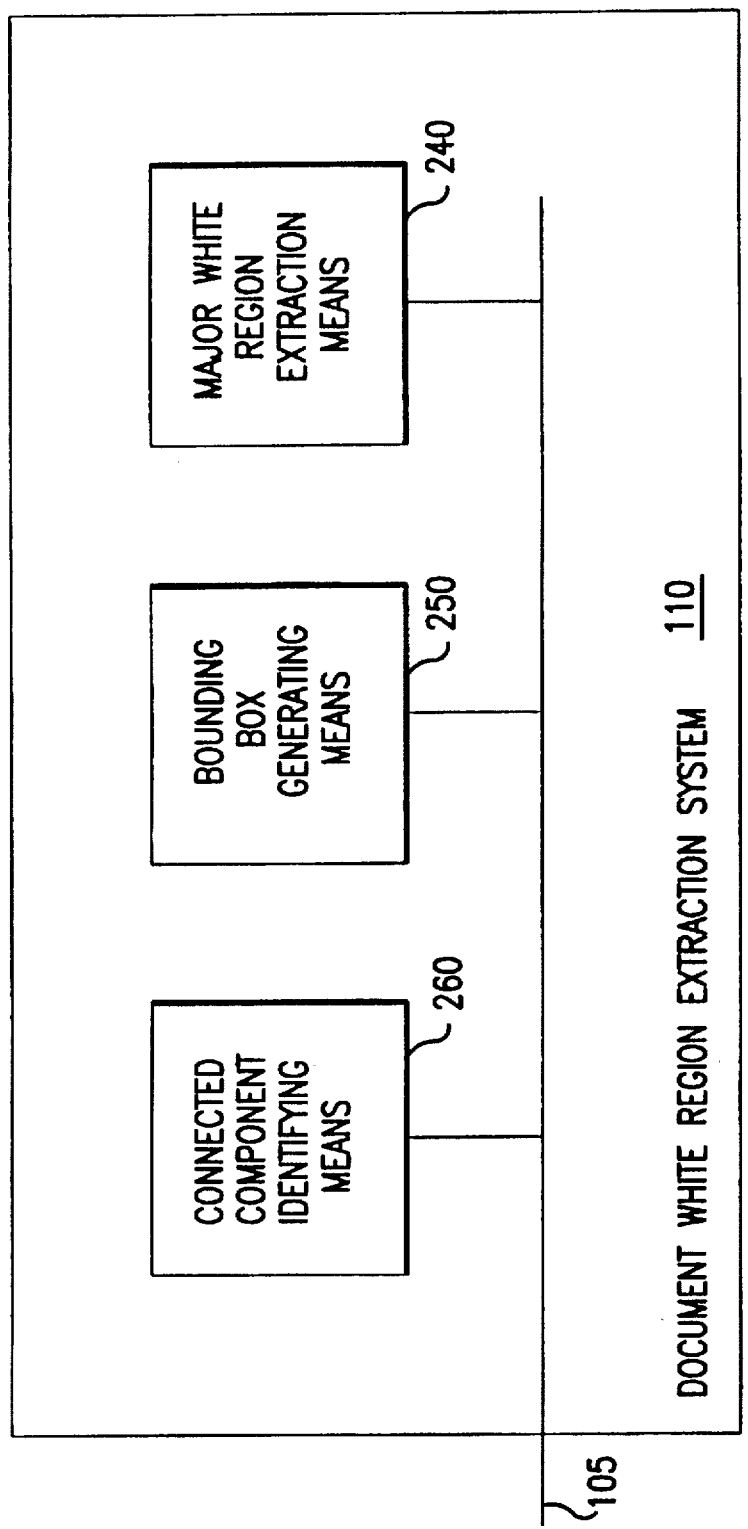
FIG. 2 is a block diagram of a preferred embodiment of the document white region extraction system of the document element identification system of FIG. 1.

FIG. 2 shows a preferred embodiment of the document white region extraction system 110 of the document element identification system 100. As shown in FIG. 2, the document white region extraction system 110 comprises a connected component identifying means 260, a bounding box generating means 250, and a major white region extraction means 240, all which are connected to the bus means 105. Document image data is first input into the connected component identifying means 260 from the scanner 210, the non-volatile memory 270, the remote interface 230, or the memory 130. The memory 130 can be located within the general purpose computer 300 or outside of the general purpose computer 300, and can be in the form of a floppy disk and disk drive, a hard disk drive, CD-ROM and CD ROM drive, an EPROM, a flash memory, or the like, as well known in the art. Likewise, the document image data from the scanner 210 may be first stored in the memory 130 before being input to the connected component identifying means 260. The document image data is input into the connected component identifying means 260 in the form of a binary image, or a plurality of bits of a digital signal, each bit representing whether a particular pixel of the document image is "on" or "off." The bounding box generating means 250 are well known in the art and generates a bounding box 420 for each connected component 410.

Figure 4:
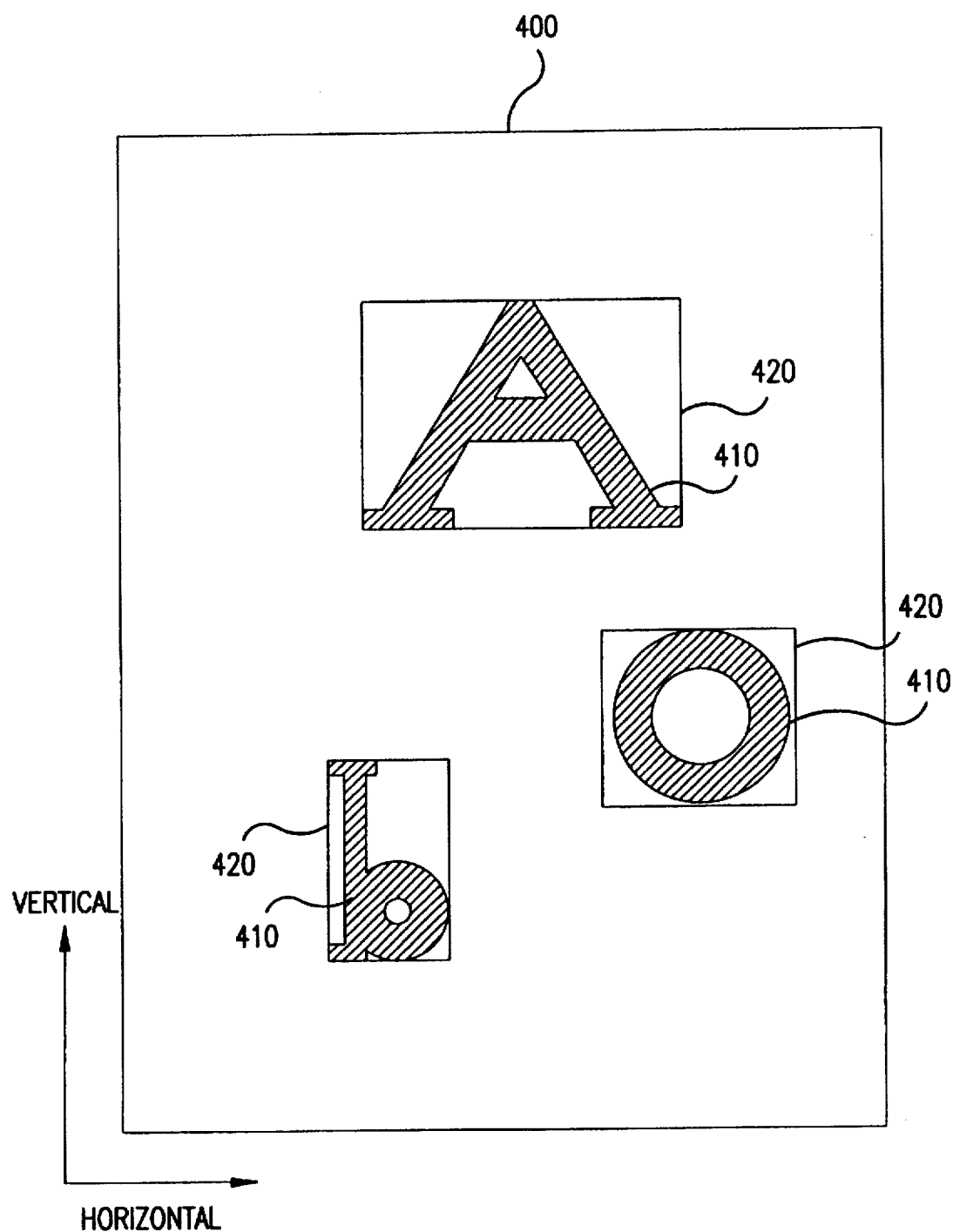
FIG. 4 shows a sample document image.

After the connected component identifying means 260 receives the document image data, the connected components identifying means 260 identifies all of the connected components in the document image. FIG. 4 shows an exemplary document image 400. The connected components 410 are found within the document image 400. Each connected component 410 comprises a series of adjacent "on" (for example, black) pixels surrounded by "off" (for example, white) pixels. Systems for identifying connected components 410 in document images 400 are well known in the art.

Once the connected components 410 of the document image 400 are identified, the bounding box generating means 250 generates a bounding box 420 for each connected component 410. The bounding box 420, as well known in the art, is a minimum-sized rectangular box which completely encloses the corresponding connected component 410, as shown in FIG. 4. Systems for generating the bounding boxes 420 from the connected components 410 are also well known in the art.

Figure 5:
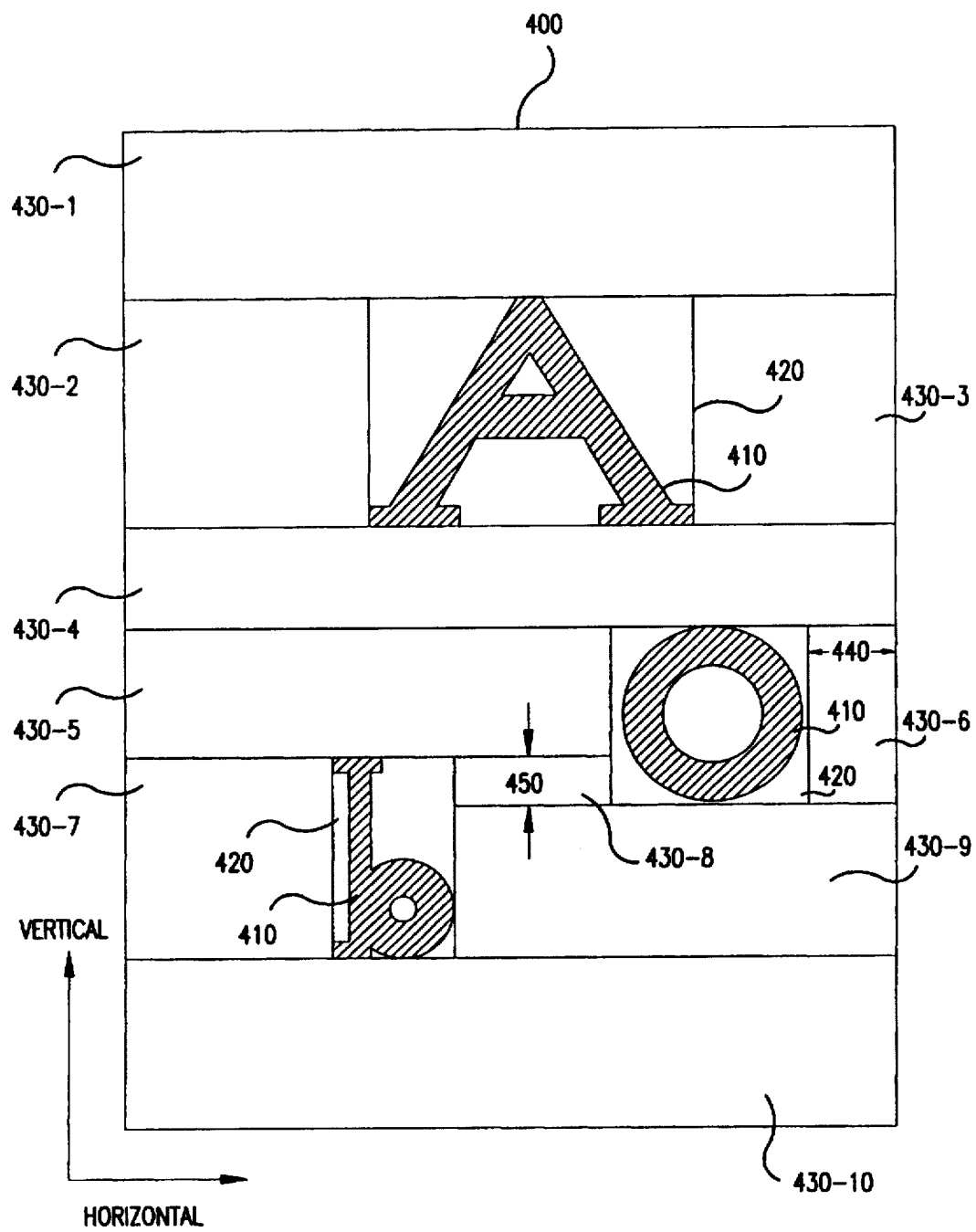
FIG. 5 shows a document image having horizontal primitive white areas extracted.
Figure 6:
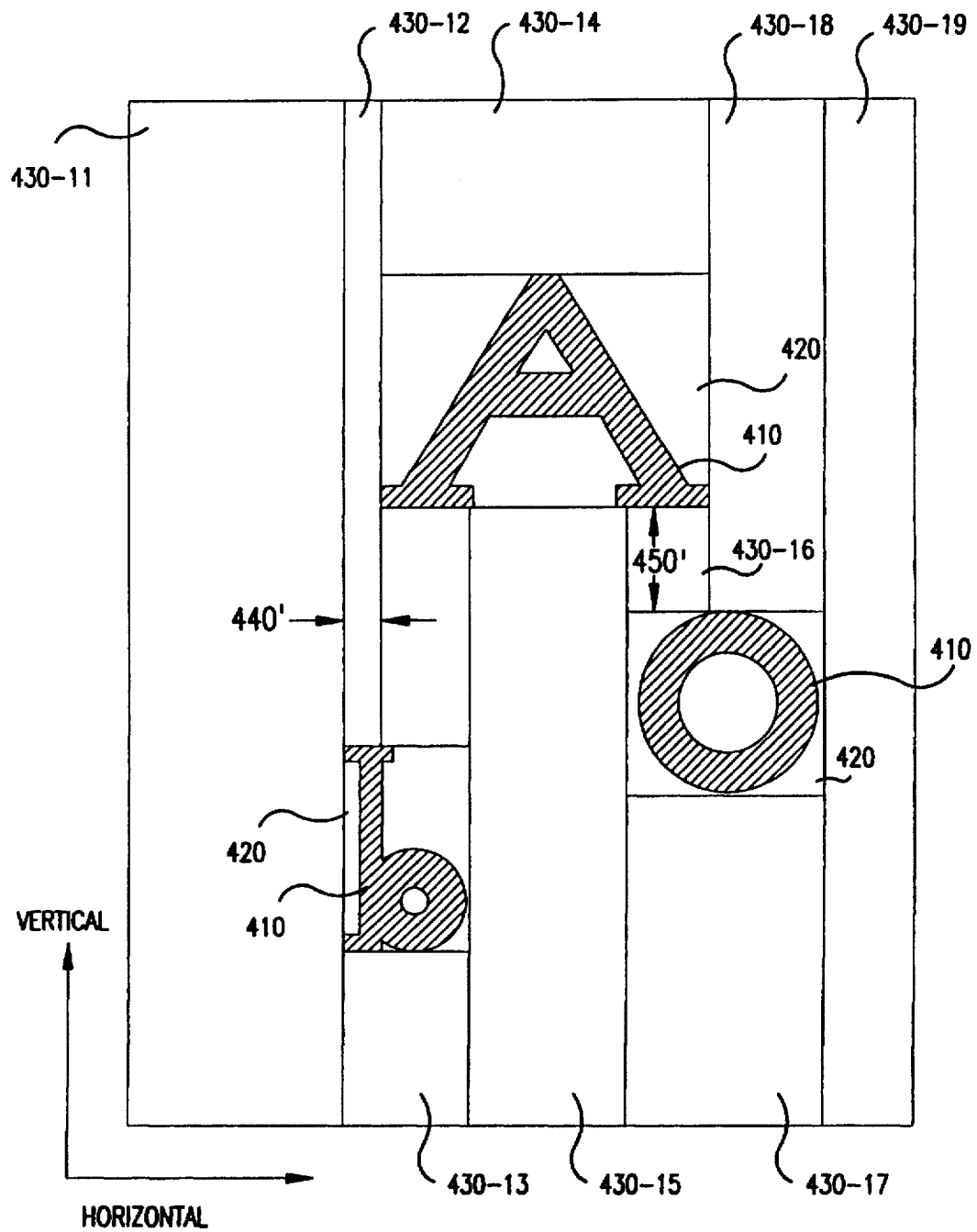
FIG. 6 shows the document image of FIG. 5 having vertical primitive white areas extracted.

The document image data with bounding box information is sent to the major white region extraction means 240, which extracts major white regions 460 in the vertical and horizontal directions of the document image 400, as shown in FIGS. 5 and 6, respectively.

Figure 3:
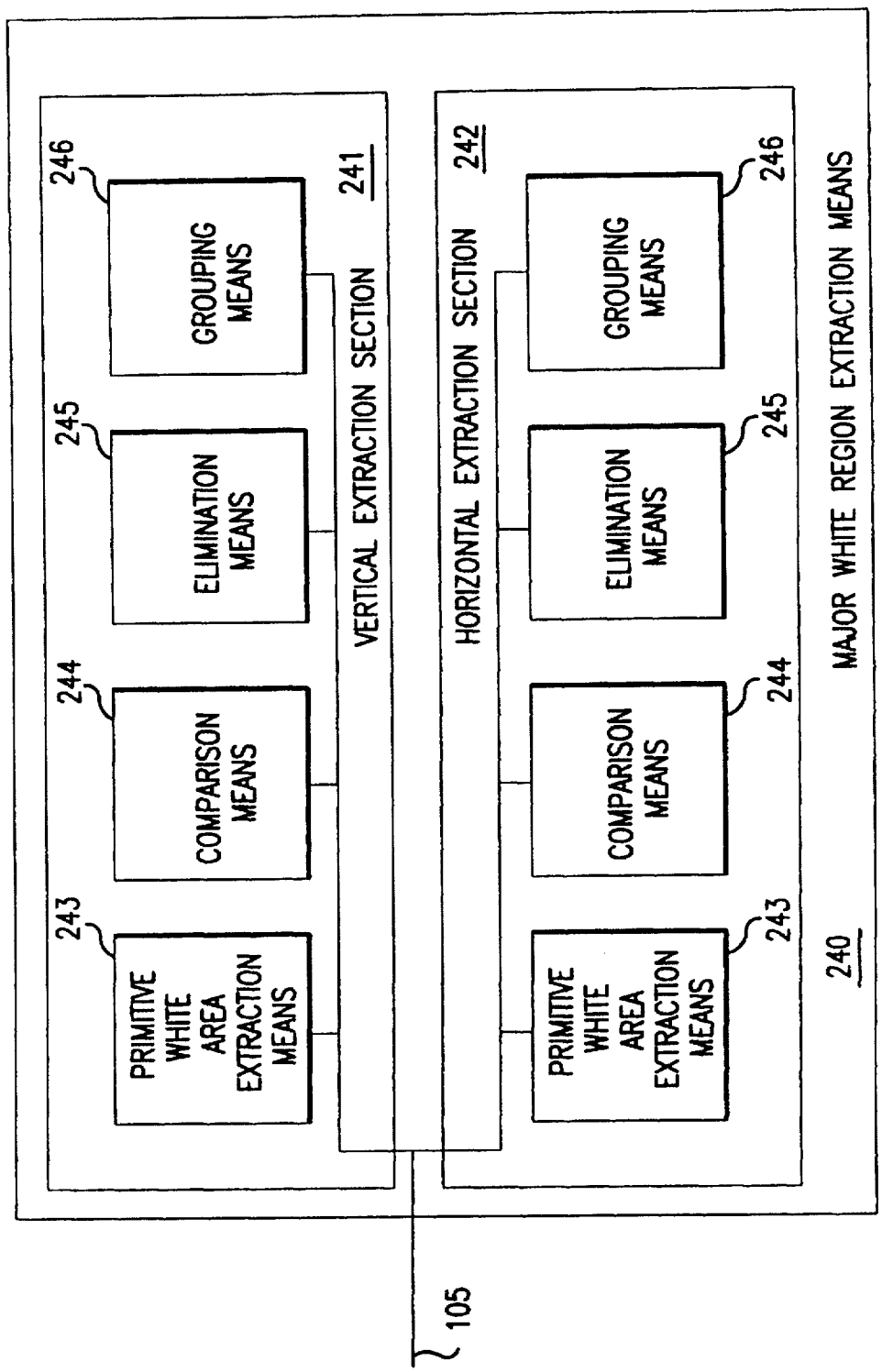
FIG. 3 is a block diagram of a preferred embodiment of the major white region extraction means.

In the preferred embodiment of the document white region extraction system 110, the major white region extraction means 240 is divided into two sections, a vertical extraction section 241 and a horizontal extraction section 242, as shown in FIG. 3. Each of the vertical extraction section 241 and the horizontal extraction section 242 comprises a primitive white area extraction means 243, a comparison means 244, elimination means 245, and a grouping means 246, each of which is connected to the bus means 105. Both the vertical extraction section 241 and the horizontal extraction section 242 contain identical components and operate in a similar fashion.

As shown in FIG. 5, the horizontal extraction section 242 first extracts primitive white areas 430-1 to 430-10 which extend beyond the thresholds for horizontal primitive white areas and assembles them into major white regions 460 that extend in the horizontal direction. Likewise, as shown in FIG. 6, the vertical extraction section 241 first extracts primitive white areas 430-11 to 430-19 which extend beyond the thresholds for vertical primitive white areas and assembles them into major white regions 460 that extend in the vertical direction.

Assembling the horizontal primitive white areas into the horizontal major white regions 460 is accomplished by grouping and merging adjacent ones of the horizontal primitive white areas 430-1 to 430-10 into one or more horizontally grouped primitive white areas according to specific rules. Likewise, assembling the vertical primitive white areas into the vertical major white regions 460 is accomplished by grouping and merging adjacent ones of the vertical primitive white areas 430-11 to 430-19 into one or more vertically grouped primitive white areas. After grouping and merging of the vertical and horizontal primitive white areas is completed, horizontal primitive white areas 430 and sets of horizontally grouped primitive white areas having a width greater than a width threshold 440 and a height greater than a height threshold 450, and vertical primitive white areas 430 and sets of vertically grouped primitive white areas having a height greater than a height threshold 450' and a width greater than a width threshold 440' are identified as the major white regions 460. Then, the identified major white regions 460 are extracted. In the preferred embodiment, for efficiency, the margin areas surrounding the columns are eliminated before the major white regions 460 are extracted.

Figure 7:
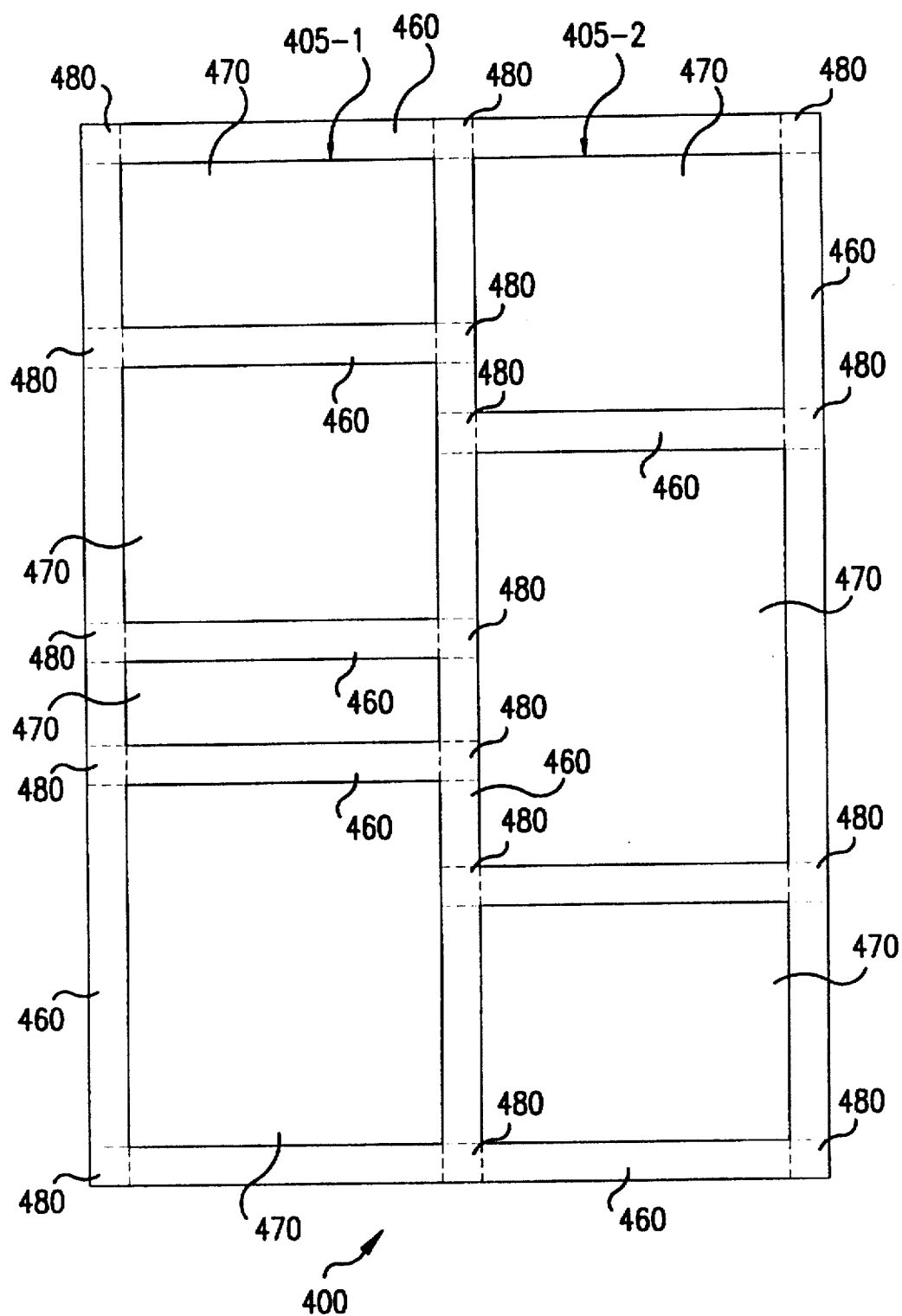
FIG. 7 shows another document image having major white regions extracted.

As shown in FIG. 7, the identified major white regions 460 surround and separate the document elements 470 from each other. Thus, the size and orientation of the major white regions 460 can be used to define the logical structure of the document.

The document white region extraction system 110 described above is only one of many contemplated embodiments for implementing the document white region extraction system outlined above. Therefore, the document white region extraction system 110 is exemplary only, and should not be construed to limit the various types and configurations of systems that can be used to implement the document white region extraction system 110.

Once the document white area extraction system 110 identifies the major white regions 460, the major white region intersections 480 between the horizontal and vertical major white regions 460 are located and the corresponding major white regions 460 are translated into a one-dimensional data string by the string translation means 150. The major white region intersections 480 are classified by type and stored with the one-dimensional data string in the memory 130 or the nonvolatile memory 270 for reference by the comparison means 160. The connecting major white region 460 between each pair of intersections 480 is classified or identified by the intersection type at each endpoint of the major white region 460, and the types of any additional intersections within the major white region 460. Then, the string translation means 150 classifies or identifies the major white regions 460 by their locations and intersections 480 with other ones of the major white regions 460, and creates, a one-dimensional data string that corresponds to the ordered sequence of appearance of the major white regions 460 in the document image. In the preferred embodiment, the one-dimensional string is created by concatenating the major white regions 460 from top to bottom and left to right.

The comparison means 160 compares the sequence of major white regions 460 provided by the string translation means 150 in the one-dimensional data string to the allowable columnar layouts defined in the structural model. The comparison means 160 is preferably, in part, a finite state machine describing acceptable or legal column separators for the document. Then, the comparison means 160 uses approximate matching techniques to match the data string to the finite state machine. The columnar layout identification means 170 then identifies the document image column layout from the comparison results generated by the comparison means 160.

Then, the logical tag assigning means 180 assigns logical tags to the areas or document elements 470 between the major white regions 460 based on the identified matching document image column layout. The document element extraction means 190 extracts the logically tagged document elements 470. Alternatively, the document element extraction means 190 can be used either instead of, or in addition to, the logical tag assigning means 180. The logical tag assigning means 180 and the document element extraction means 190 are described in greater detail in the parent applications Ser. Nos. 08/318,857 and 08/315,875.

As shown in FIG. 7, the document image 400 can contain any number of major white regions 460, which divide the document image into any number of document elements 470 having any number of intersections 480. The document elements 470 of the document image 400 are logically identified by comparing the spatial or geometric relationships between the major white regions 460 existing between the document elements 470 against the spatial or geometric relationships defined in the acceptable or legal columnar layouts for each source document. If the geometric relationships between the major white regions 460 of the document image columns match the defined acceptable relationships, the document image column layout of the document elements 470 of the document image 400 is identified. As shown in FIG. 7, document element columns 405-1 and 405-2 are identified. However, before the document element column layout can be identified, the document element segmentation system 100 must be provided with a definition of the spatial or geometric relationships between the document element types.

A structural model can be the description of the source document's structure that represents acceptable or legal layouts of columns within the source document. In the examples shown in FIGS. 7, the input document image has a two-column layout. It should be appreciated that this invention is not limited in scope to only two-column layouts. Rather, the apparatus and methods disclosed can be generalized to a three-column layout, a four-column layout, or a n-column layout.

For a two-column layout, there are three situations that must be considered when a figure, a table or supplemental text, for example, is inserted. In the first situation, the figure, the table or the supplemental text element is placed within a column. This case does not effect the pattern of the major white regions.

In the second situation, the figure, the table or the supplemental text element (generally, the insert) having a width greater than one column width but smaller than the width of the entire document image is inserted into the document image. In this case, the text area on one side or on both sides of the insert is reduced by the size of the insert. The insert thus alters the major white region pattern by forming a different major white region pattern.

In the third situation, the figure, the table or the supplemental text element (generally, the insert), has a width equal to the width of the entire document image, i.e. the insert covers both columns. This case eliminates the text on both sides of the insert. The insert thus alters the major white region pattern by forming a different type of major white region.

The document element segmentation system 100 assumes that inserted elements do not overlap each other. Therefore, all cases of inserted elements are represented by combinations of the three cases where a single element is inserted. This assumption allows multiple elements to be inserted into one or more columns.

Column separators are represented by an alternating sequence of horizontal and vertical major white regions 460 intersecting each other. Further, in the preferred embodiment, even if there is no vertical path, it is possible to match the sequence. Further, the four margins, the top margin, the bottom margin, the left-side margin and the right-side margin, can be removed before the major white regions 460 are extracted by the document white region extraction system 110. Then, the four margins can be replaced to form closed loops of major white regions to extract the identified document element columns.

Whenever an insert is inserted into a column, at least one major white region 460 is also inserted, to separate the insert from the surrounding text. If the insert is aligned with one of the vertical edges of a column, a vertical major white region 460 is inserted adjacent to the opposite side. If the insert is inserted into the middle of a column, horizontal major white regions are inserted both above and below the insert, separating it from the surrounding text. A horizontal major white region 460 is inserted below an insert aligned with the top edge of the column, and a horizontal major white region 460 is inserted above an insert aligned with the bottom edge of the column.

In the preferred embodiment, there are six types of major white regions 460 classified by the positions of the major white regions 460 forming the major white region intersections 480.

Figure 8A:
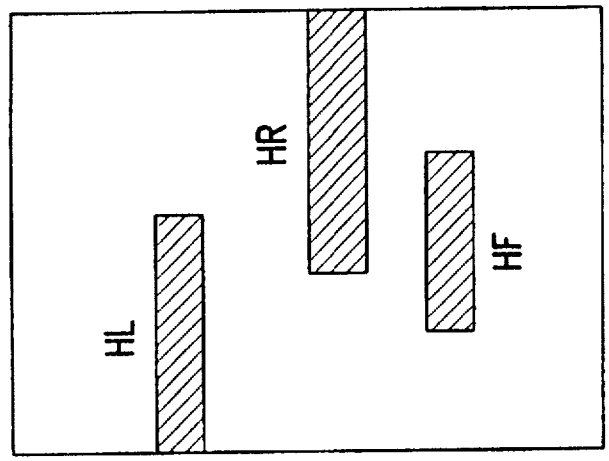
FIGS. 8A and 8B are sample document images showing major white region intersection types.
Figure 8B:
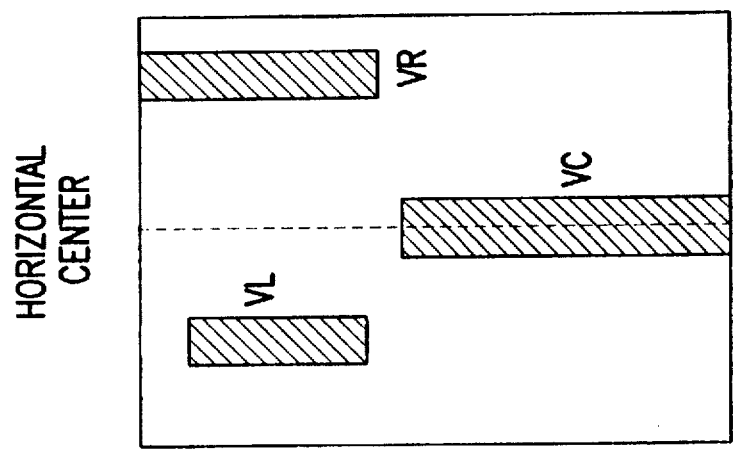

As shown in FIGS. 8A and 8B, the types of major white regions 460 are:

HLR: A horizontal major white region that intersects both the left margin major white region and the right margin major white region of the columns;

HL: A horizontal major white region that intersects only with the left margin major white region;

HR: A horizontal major white region that intersects only with the right margin major white region;

HF: A horizontal major white region that intersects neither the left margin major white region nor the right margin major white region but intersects at least one vertical major white region;

VC: A vertical major white region that includes at least a portion of the horizontal center-line of the document image;

VL: A vertical major white region that is located to the left of the horizontal center of the document image;

VR: A vertical major white region that is located to the right of the horizontal center of the document image; and ε: The empty symbol.

As shown n FIG. 8, the string translation means 150 categorizes the vertical major white regions 460 by the horizontal positions. A vertical major white region 460 located in the area including the horizontal center is classified as "VC". A vertical major white region 460 located to the left of the horizontal center is classified as "VL". Similarly, a vertical major white region 460 located to the right of the horizontal center is classified as "VR". Horizontal major white regions 460 are also classified by their locations. If the horizontal major white region 460 does not extend across the vertical center-line of the document image, the major white region is discarded by the string translation means 150.

Further, the string translation means 150 applies thresholds to the vertical and horizontal major white regions 460. If a HL major white region 460 intersects a VC major white region 460 and the HL major white region 460 and the HL major white region 460 horizontal width does not exceed by very much (within a threshold value) the width between the VC major white region 460 and the left margin area, the HL major white region 460 should be treated as separator of elements within a column. Therefore, as shown in FIG. 9B, the HL major white region 460 is removed. Similarly, HR major white regions 460 separating document elements within columns are also removed.

Once the document white area extraction system 110 identifies the major white regions 460 in the input document image, the major white region intersections 480 between the horizontal and vertical major white regions 460 are located and the corresponding major white regions are translated into a one-dimensional data string by string translation means 150. The connecting major white region 460 between each pair of intersections 480 is classified or identified by the intersection type at each endpoint of the major white region 460, to create a one-dimensional data string that corresponds to the ordered sequence of appearance of the major white regions 460 in the document image. In the preferred embodiment, the one-dimensional string is created by concatenating the major white regions 460 from top to bottom and left to right.

Figure 9A:
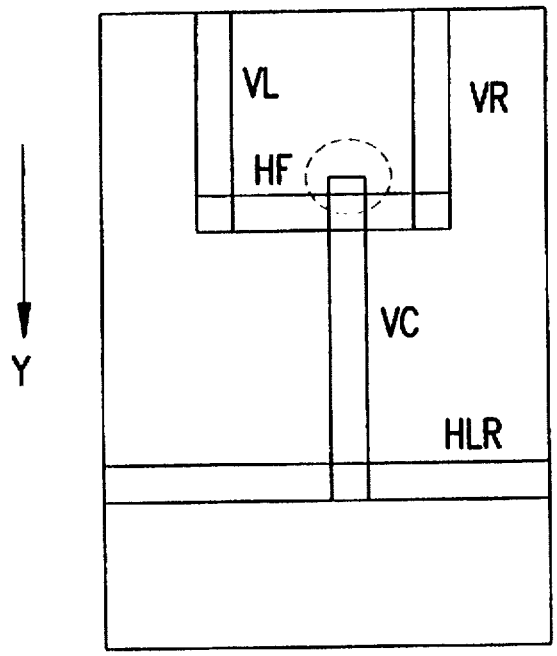
FIGS. 9A and 9B show sample document images and thresholding criteria.
Figure 9B:
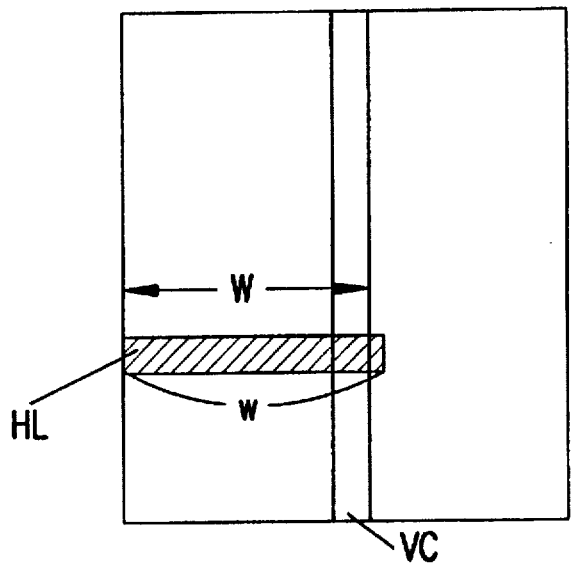

Further, as shown in FIG. 9A, if there are (horizontal and vertical) major white regions 460 whose top positions are very close (within a threshold value), the string translation means 150 treats those major white regions 460 as if their top positions are the same. Therefore, in FIG. 9A, the top positions of an HF major white region 460 and a VC major white region 460 are treated as the same position, and the HF major white region 460 appears first in the one-dimensional string because horizontal major white regions 460 are analyzed first, and then the vertical major white regions are analyzed from left to right. In this way, the major white regions 460 are translated into a one-dimensional sequence of major white regions. The one-dimensional string (ODS) resulting from the document image shown in FIG. 9A is set forth in Equation (1):

$$ODS=VL\text{-}VR\text{-}HF\text{-}VC\text{-}HLR. \quad (1)$$

Figure 10B:
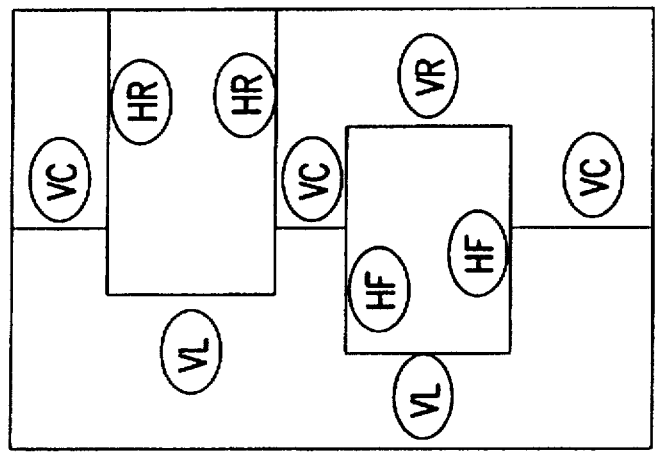
FIGS. 10A and 10B are sample document images showing repetition of document elements within a document column.
Figure 10A:
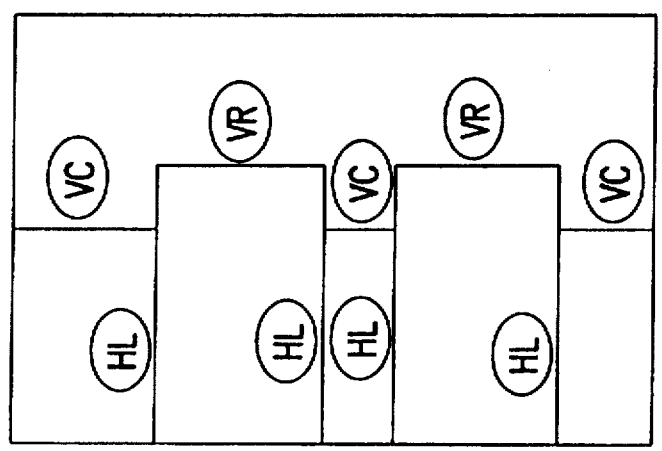

The document element segmentation system 100 can handle repeated sequences of major white regions 460, as shown in FIG. 10. The one-dimensional strings corresponding to the ordered sequences of major white regions 460 in the document images shown in FIGS. 10A and 10B are set forth in Equations (2) and (3):

$$ODS=VC\text{-}HL\text{-}VR\text{-}HL\text{-}VC\text{-}HL\text{-}VR\text{-}HL\text{-}VC; \quad (2)$$

and $$ODS=VC\text{-}HR\text{-}VL\text{-}HR\text{-}VC\text{-}HF\text{-}VL\text{-}VR\text{-}HF\text{-}VC. \quad (3)$$

Figure 11:
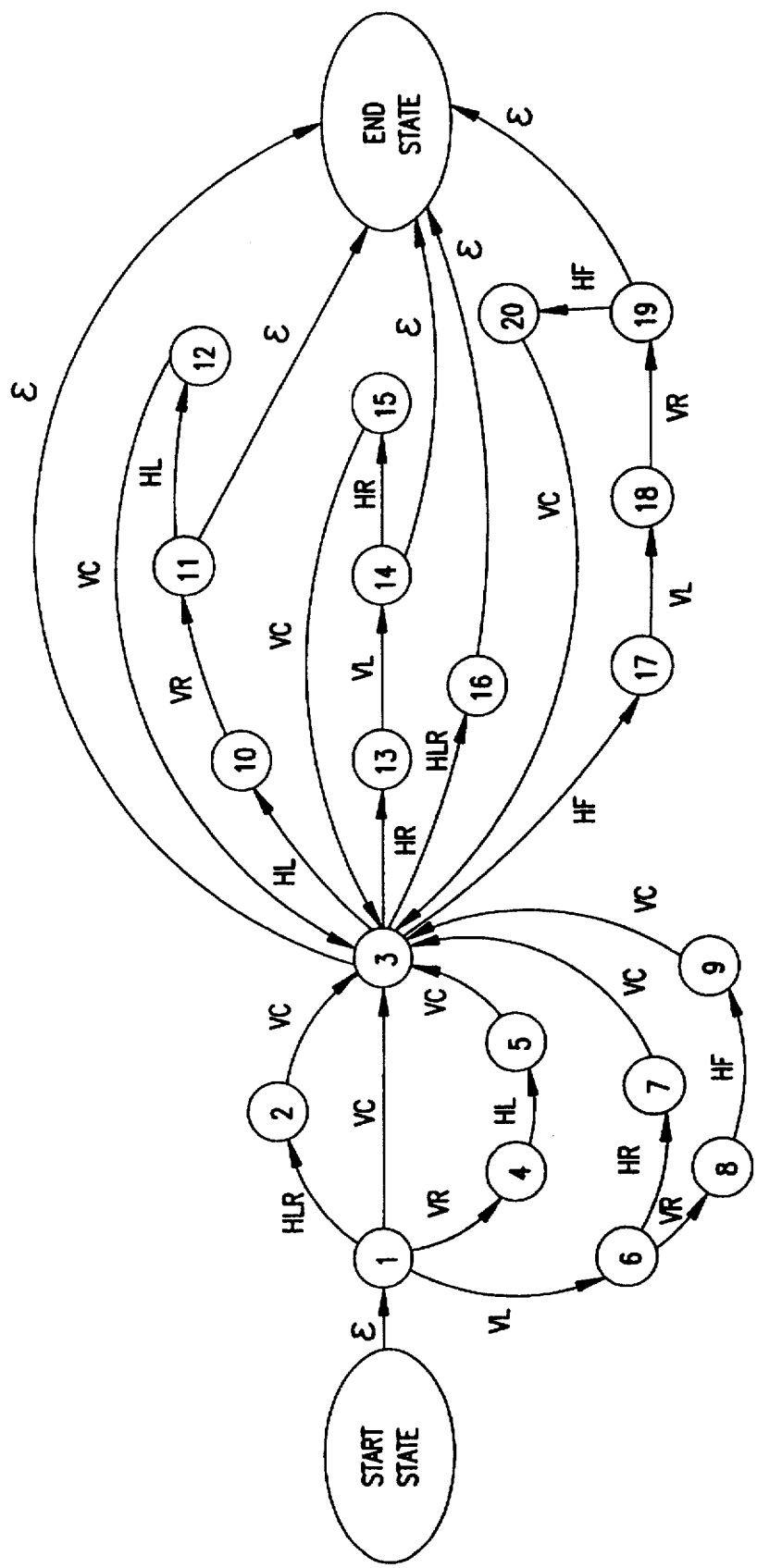
FIG. 11 is a diagram showing the states of a finite state machine of the first preferred embodiment of this invention.
Figure 12B:
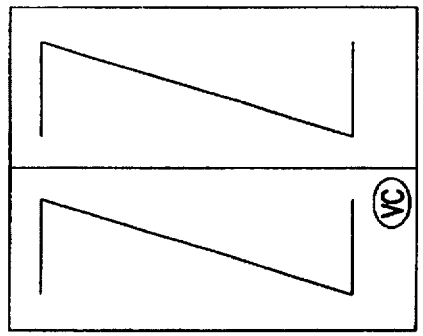
Figure 12E:
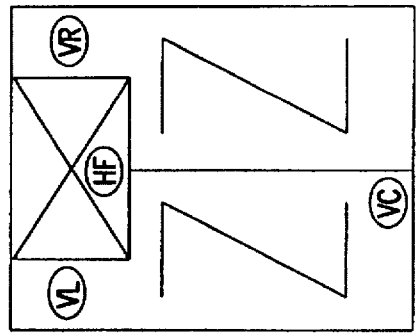
Figure 12A:
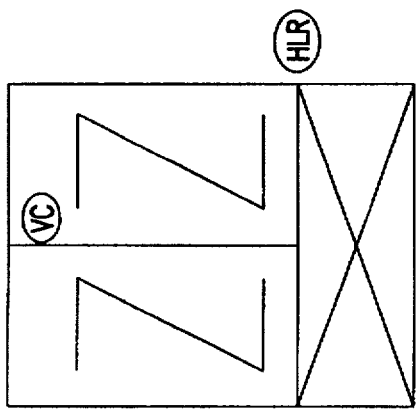
Figure 12D:
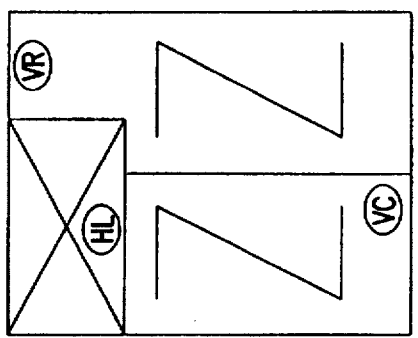
Figure 12C:
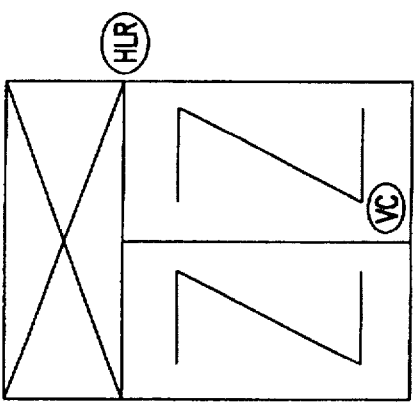
Figure 12F:
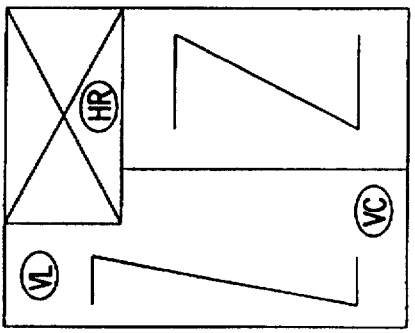

One possible finite state machine used in the preferred embodiment for two-column document image separation is shown in FIG. 11. This finite state machine mechanistically processes an input string to decide whether the input string belongs to a set of comparison strings. As shown in FIG. 11, the column separator sequence, or data string identifying the major white regions 460 in the document image corresponds to the input string. The set of comparison strings corresponds to the acceptable two-column layouts defined by the structural model, which in the preferred embodiment is the finite state machine.

Each transition between states in the finite state machine shown in FIG. 11 corresponds to a match between the major white region and the structural model as determined by the comparison means 160. The major white region one-dimensional data string of Equation 3, which corresponds to the document image as shown in FIG. 10B, and the transitions in the finite state machine shown in FIG. 11 can be matched. This matching generates the sequence "start state-state 1-state 3-state 10-state 11-state 12 state 3-state 17-state 18-state-19-state 20-state 3-end state. Therefore, the one-dimensional data string in Equation 3 is a valid column separator sequence of major white regions for a two-column document image.

FIGS. 12A–12L show the set of acceptable or legal column separating sequences for the preferred embodiment having a two-column layout, as defined by the finite state machine shown in FIG. 11. Only single occurrences of the acceptable column separating sequences are shown in FIG. 12, as multiple occurrences can be treated as additional serial instances of the identified major white region patterns.

The comparison means 160 determines a cost matrix used to select an optimal alignment between the finite state machine and the input string. Each row of the matrix corresponds to a character of the input string, which in the preferred embodiment is a major white region 460 in a top to bottom, left to right ordered sequence. Therefore, for example, if two vertical major white regions 460 have the same top positions, the left most major white region would be selected first. Each column in the cost matrix corresponds to a state of the finite state machine in order from the initial or start state to the final or end state, as shown in FIG. 11. The numbers of the states are used as identifiers. The editing cost is the sum of the primitive costs for the editing operations "insertion", "deletion", and "substitution". In the preferred embodiment, the costs of insertion, deletion and substitution operations are each set −1. When the one-dimensional data string or column separator sequence returns a total cost of 0, the column separator sequence is valid or matched. Additionally, a path cost of 0 indicates the path completely traversed the finite state machine from start state to end state. The cost of each path through the finite state machine that is unsuccessful will return a negative total cost for the column separator sequence because the primitive editing costs are defined as negative costs. The optimal path has the maximum cost, which is interpreted in the preferred embodiment to be closest to 0.

In the preferred embodiment, these primitive costs are predetermined in the document element segmentation system 100 and are stored in a primitive cost storage area in the memory 130. Further, the primitive costs do not have to be equal. That is, the cost of a substitution operation, for example, could be set to −2, i.e. twice the cost of an insertion or deletion operation. After determining the entire cost matrix, an optimal path having the maximum cost is obtained by tracking the cost matrix from the last row to the first row.

Figure 21:
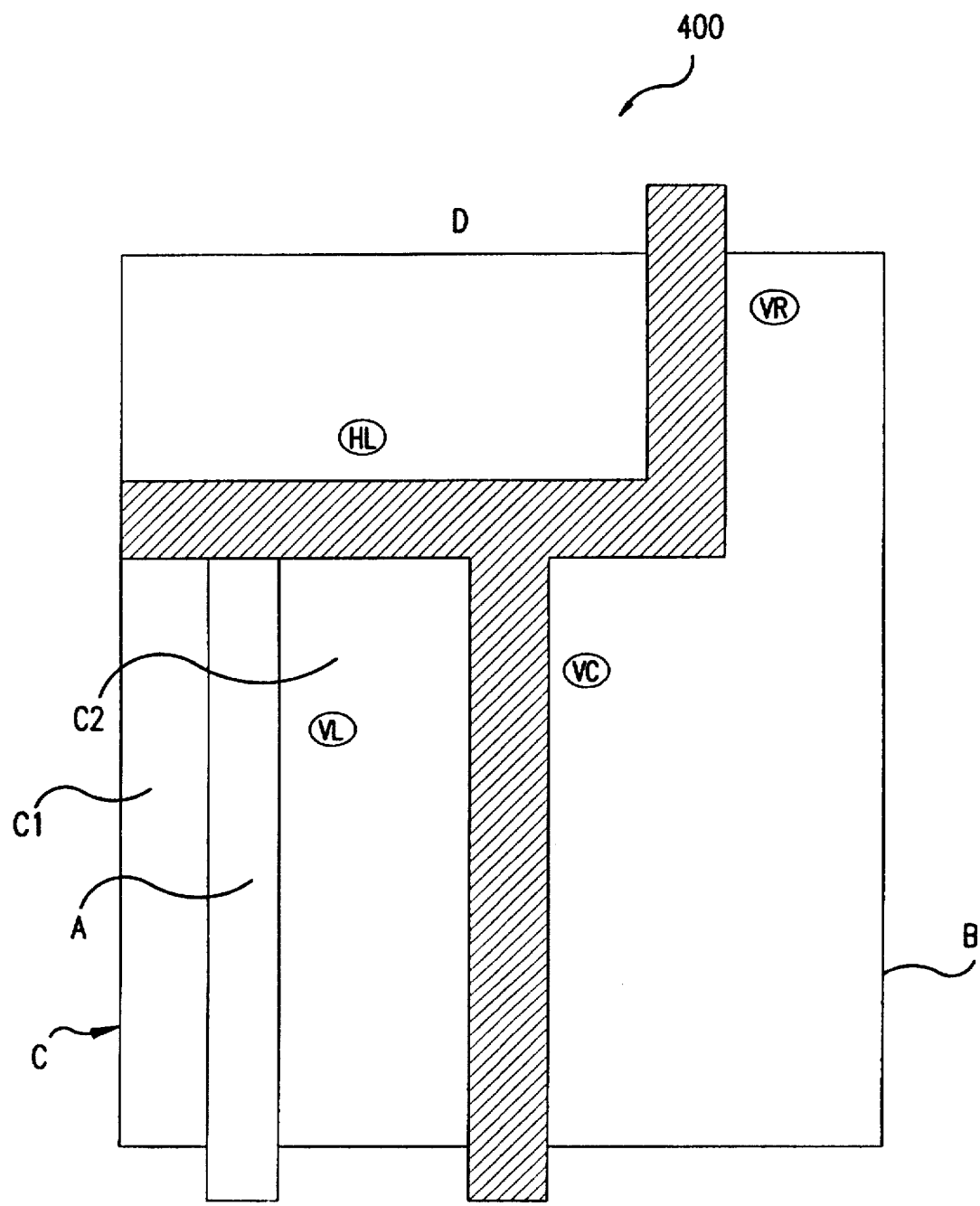
FIG. 21 is a diagram showing an input image having structurally unimportant major white regions extracted by a document segmentation system.

FIG. 21 shows an example of an insertion operation to insert a VL major white region 460 into an unanalyzed document image 400. The column separator sequence generated by the string translation means 150 for FIG. 21 would be "VR-HL-VL-VC". When the column separator sequence is compared to the finite state machine in FIG. 11, the highest cost path generated is "start state-state 1-state 4-state 5-state 3-end state". Therefore, because the VL major white region 460 VL is an illegal major white region 460 in the sequence, the finite state machine indicates that the VL major white region VL is an improper insertion into the string.

Figure 22:
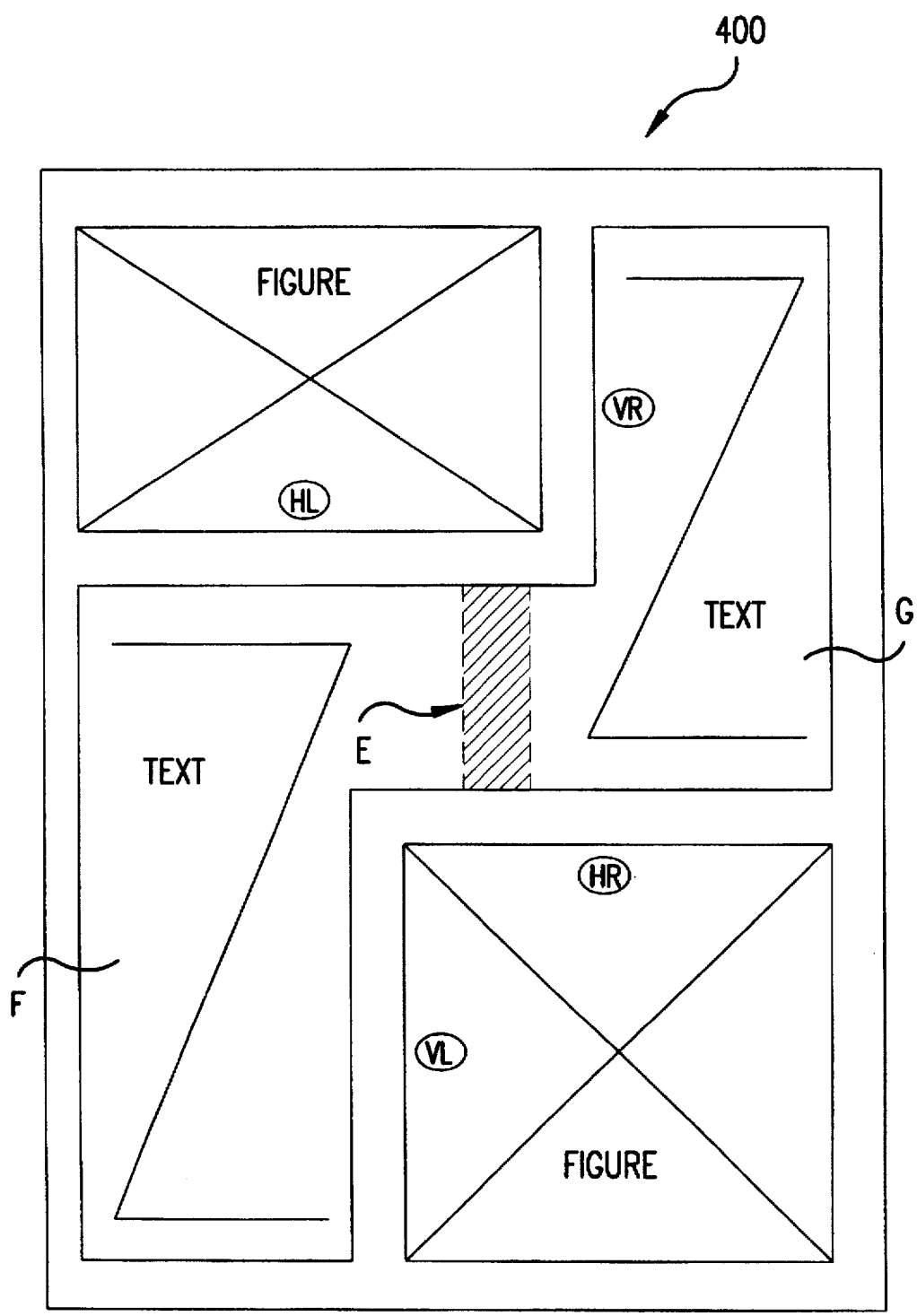
FIG. 22 is a diagram showing an input image having a structurally important major white region that was not extracted by a document segmentation system.

FIG. 22 shows an unanalyzed document image 400 from which the string translation means 150 generates the column separator sequence "VR-HL-HR-VL". When the column separator sequence is compared to the finite state machine shown in FIG. 11, the highest cost path generated is "start state-state 1-state 4-state 5-deletion-state 13-state 14-state 3-end state". Therefore, because the highest cost path through the finite state machine indicates a gap between states 5 and state 13, there is a deletion in FIG. 22.

After the optimal sequence of the major white regions 460 in the document image is determined by the comparison means 160, the columnar layout identification means 170 determines the document element column layout of the input document image from the optimal sequence.

First, the columnar layout identification means 170 determines if there are any insertions, deletions, or substitutions in the optimal sequence. If the optimal sequence has a cost of 0, the major white regions of the optimal sequence are used for column separation. If the optimal sequence has insertions, as shown in FIG. 21, the insertions must be deleted by identifying the surrounding matched major white regions, and the remaining major white regions are used for document image column separation. As shown in FIGS. 21 and 22, if the optimal sequence has deletions or insertions, the matched major white regions are determined to identify the types of extraneous or missing major white regions, respectively. Substitutions are treated in the same manner as deletions. Then, the document white region extraction system 110 processes the document image using a different (i.e. smaller or larger) threshold to extract the missing or to remove the extraneous, major white regions, respectively, of the optimal sequence.

If the document white region extraction system 110 is not able to successfully process the document image to accomplish this, the columnar layout identification means 170 selects the next best optimal path based on the costs of the possible paths through the finite state machine. In the preferred embodiment, this is allowed only if there are multiple optimal paths whose costs are the same. Then, the evaluation outlined above is performed using the selected next best optimal path in place of the best optimal path.

However, if the document white region extraction system 110 is able to successfully accomplish the elimination and extraction processes, the four margins are added back into the sequence of major white regions in the next best optimal sequence and the document image document elements are segmented into columnar images. In the preferred embodiment, the document image is segmented into two potentially non-rectangular document columns.

The cost matrix generated from the input column separator sequence and the finite state machine is based on approximate regular expression matching as discussed in Myers. In the preferred embodiment, the cost matrix is generated and the optimal path is determined using the method shown on page 20 of Myers.

Figures 13A, 13B, 13C:
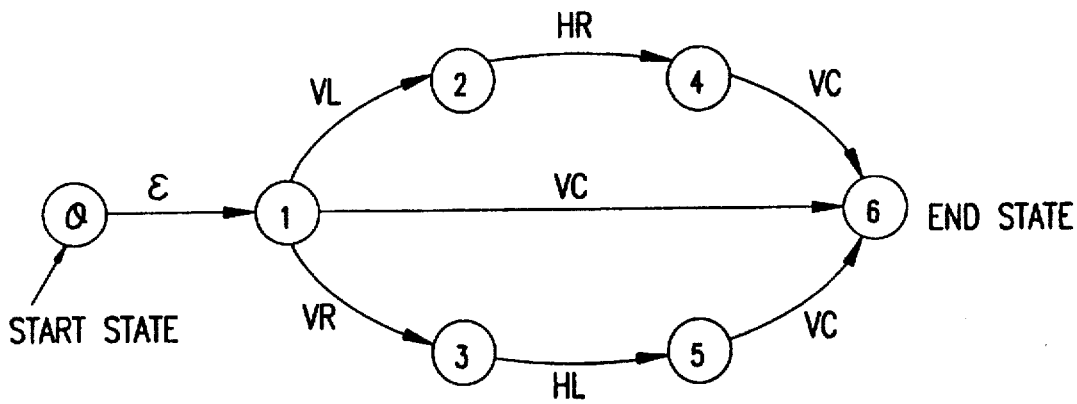
FIG. 13A shows a sample finite state machine and FIGS. 13B and 13C show the corresponding cost matrices.

An example of how the cost matrix is generated based on another finite state machine is shown in FIGS. 13A–13C and 14A–14D. The finite state machine shown in FIG. 13A can handle the document image examples shown in FIGS. 12C, 12D and 12E. The predetermined cost for an insertion, a deletion or a substitution is set to −1. As shown in FIG. 13A, the finite state machine has three distinct paths connecting the start state to the end state. The three paths are: 1) state 1-state 2-state 4-state 6; 2) state 1-state 6; and 3) state 1-state 3-state 5- state 6; and state 1-state 3-state 5-state 6. Any major white region sequence that matches any one of the three paths has a total cost of 0. The finite state machine is independent of the cost matrix.

Figure 14B:
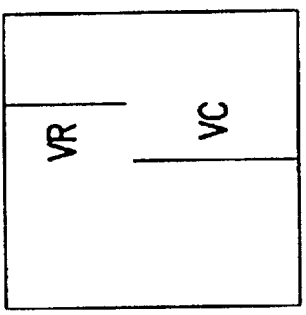
FIGS. 14A-14D show a sample document having major white region deletions and insertions.
Figure 14D:
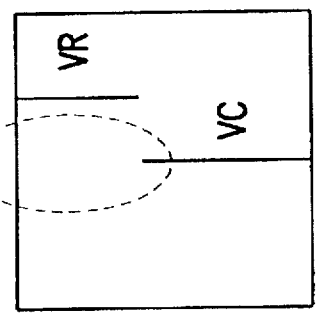
Figure 14A:
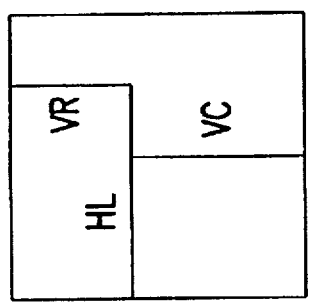

The cost matrix for the lower path "state 0-state 1-state 3-state 5-state 6", corresponding to the document layout shown in FIG. 14A, is shown in FIG. 13B. The first transition in FIG. 14A using the finite state machine in FIG. 13A is ε. Looking at the cost matrix shown in FIG. 13B, the cost to move from state 0 to state 1 is 0. Row 0 of the cost matrix shown in FIG. 13B indicates the costs to move from state 0 to each of states 1–6 of the finite state machine shown in FIG. 13A. Row 1 of the cost matrix of FIG. 13B indicates the costs to move from state 1 to each of states 0 and 2–6 for the input sequence "Start, VR". Row 2 of the cost matrix of FIG. 13B indicates the costs to move from state 3 to states 0–2 and 4–6 for the input sequence "VR, HL". Row 3 of the cost matrix of FIGS. 13B indicates the costs to move from state 5 to states 0–4 and 6 for the input sequence "VR, HL, VC". As shown in the cost matrix of FIG. 13B, the cost is 0 to move from state 0 to state 1, from state 1 to state 3, from state 3 to state 5 and from state 5 to state 6. This corresponds to the input sequence "VR, HL, VC". The path "state 0 -state 1-state 3-state 5-state 6" is a valid path through the final state machine of FIG. 13A, and "VR, HL, VC" is a valid column separator sequence of the major white regions 460, as shown by the document layout of FIG. 14A.

Figure 14C:
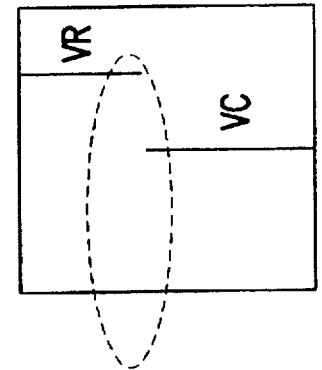

FIG. 14B shows a document image having a column separator sequence of "VR, VC". FIG. 14B can be analyzed using two different paths of the finite state machine of FIG. 13C. The cost matrix for FIG. 14B, the sequence "VR, VC" is shown in FIG. 13C. FIG. 14C shows the analysis using the "State 0 -state 1- state 3 -state 5 -state 6" path (Path A of FIG. 13C) through the finite state machine of FIG. 13C where "HL" is missing from the path. Traversing the finite state machine of FIG. 13A using path A for the input sequence "VR, VC" comprises moving from state 0 to state 1, and then to state 3, at a total cost of zero. However, as shown in row one of the cost matrix of FIG. 13C, there is no transition in the finite state machine e.g., FIG. 13A from state 3 for the input sequence "VR, VC" which has a cost of zero. The best transition is from state 3 to state 5 is at a cost of −1. As shown in FIG. 13C, this corresponds to an improper deletion of state 5 (HL) from the input sequence "VR, VC," resulting in the corresponding best sequence "VR, HL, VC". However, since the resulting sequence "HL, VC" has similar costs of −1, as shown in rows one and two of the cost matrix of FIG. 13C, the cost to move from state 5 to state 6, is effectively zero. Therefore, the total cost of path A is −1. Comparing the matched adjacent major white regions VR and VC, the columnar layout identification means 170 identifies "HL" as the missing transition.

FIG. 14D shows the analysis of the VR - VC column separator sequence using the state 0-state 1-state 6 path (path B of FIG. 13C) through the finite state machine of FIG. 13A. As shown in row one of the cost matrix of FIG. 13C, instead of moving from state 1 to state 3, the finite state machine can remain in state 1 at a cost of −1, this corresponds to an improper insertion of state 3 (VR) into the sequence "VR, VC", resulting in the sequence "VC". Further, as shown in rows one and two of the cost matrix of FIG. 13C, since the transaction from state 1 in row one to state 6 of row 2 has a similar cost, the cost to move from state 1 to state 6 is zero. Therefore, a path B, "VR" is an insertion. Comparing the "VR-VC" path to the cost matrix in FIG. 13C, the "VR" transition from state 1 of row zero to state 1 of row one has a cost of −1. Then, the "VC" transition from state 1 to state 6 of row 2 has a cost of 0, for a total cost for path B of −1.

In summary, for the finite state machine shown in FIG. 13A, two cost matrixes are shown in FIGS. 13B and 13C for the two column layouts shown in FIG. 14A and FIG. 14B, respectively. In FIGS. 13B and 14A, the sequence "VR, HL, VC" is successfully matched by the finite state machine and the cost of the optimal path is 0. On the other hand, in FIGS. 13C and 14B there are two possible optimal paths A and B in FIG. 13C whose costs are both −1, because in FIG. 14C, HL is deleted from the optimal path to obtain the sequence shown in FIG. 14B, and in FIG. 14D, VR is inserted into the optimal path to obtain the sequence shown in FIG. 14B.

The document elements 470 of the segmented document column of the unanalyzed document image 401, along with the matching column expression, are stored in the memory 130 or output to the processor 140 for further processing. For example, a technique for classifying document elements by analyzing the structure of a document image column to logically tag the document elements is disclosed in U.S. Patent Application No. (Attorney Docket No. PX/95002), which is co-filed with this application and incorporated by reference.

Figure 15:
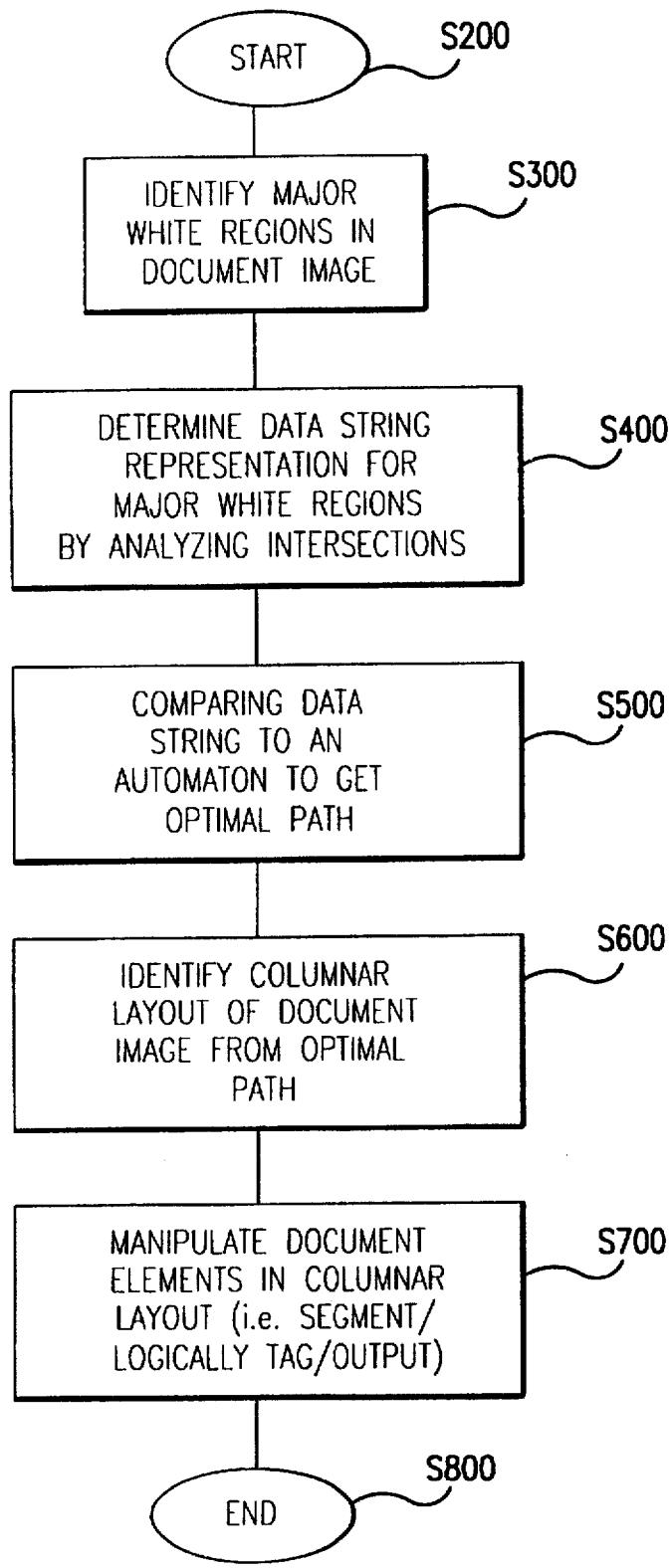
FIG. 15 is a flow chart outlining one preferred embodiment of a method for segmenting complex column document elements by major white region pattern mapping.

One preferred embodiment of a method for segmenting document elements 470 using the above-described complex column segmentation by major white region pattern matching is outlined in FIG. 15. Starting from step S200, the document image major white regions are extracted in step S300. Once the document image major white regions are extracted, in step S400 a data string representation of the major white regions in the input document image is determined by analyzing the major white region intersections.

In step S500, the data string representation is input as an input string to a finite state machine. The output of the finite state machine is an optimal path representing a best interpretation of the extracted major white regions in the input document image. The finite state machine characterizes the legal or acceptable major white regions 460 which extend between the identified major white region intersections 480. The optimal path is the (or one) least cost path through the states of the finite state machine, based on predetermined editing costs for inserting, substituting, or deleting major white regions from the paths through the finite state machine, as determined by a cost matrix.

In step S600, the identified optimal path is used to determine the columnar layout of the input document image. Then, in step S700, the document elements in the input document image are manipulated by segmenting or logically tagging or outputting the document elements identified from the columnar layout. Then, in step S800, the process ends.

Figure 16:
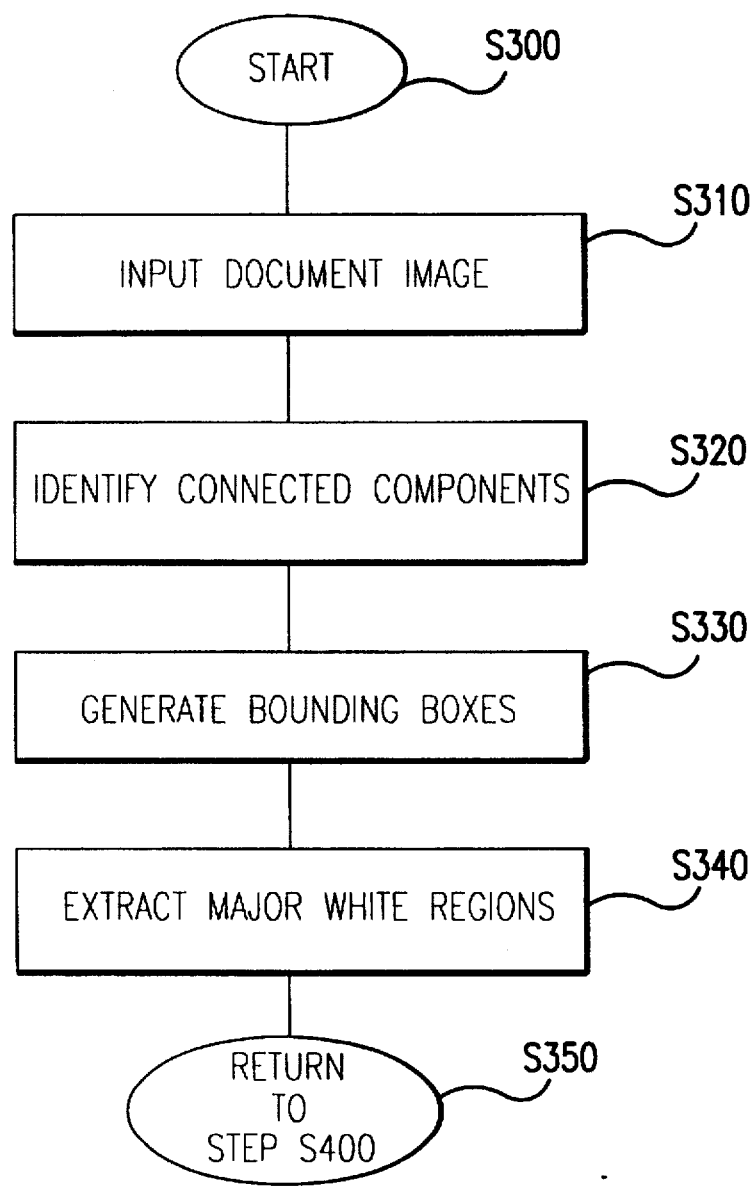
FIG. 16 is a flow chart outlining one preferred embodiment of the step of identifying major white regions from an input document image of FIG. 15.

FIG. 16 outlines in greater detail one preferred embodiment of step S300 for extracting the document image major white regions 460. After starting in step S300, the document image 400 is input in step S310. In step S320, the connected components 410 of the document image 400 are identified. Next, in step S330, a bounding box 420 is generated for each of the connected components 410 identified in step S320. In step S340, the major white regions 460 are extracted. Then, in step S350, the process returns to step S400.

Figure 17:
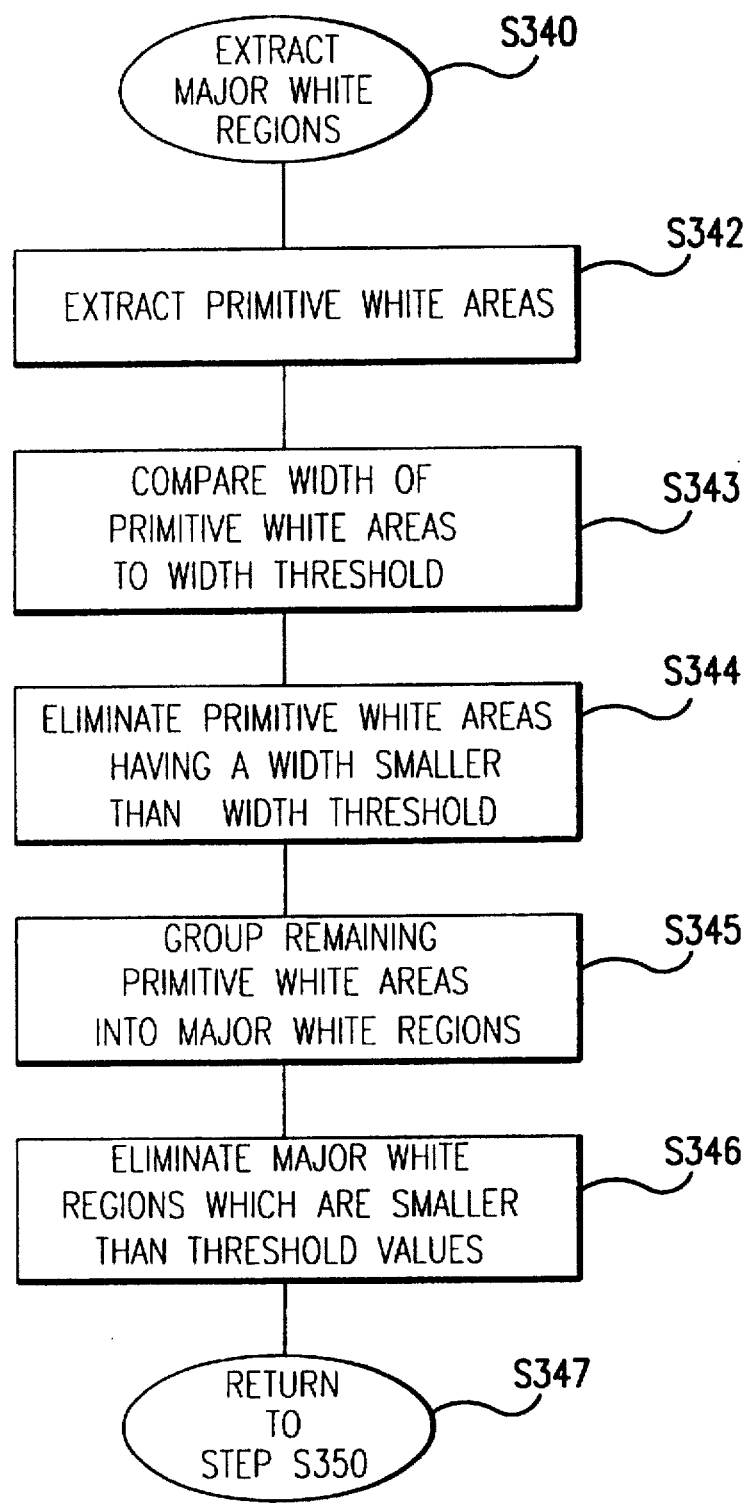
FIG. 17 is a flow chart outlining one preferred embodiment of the step of extracting major white regions of FIG. 16.

FIG. 17 outlines in greater detail one preferred embodiment of step S340 for extracting the major white regions. After starting in step S340, the primitive white areas 430 are extracted in step S342. As shown in FIG. 5, the primitive white areas 430 are rectangular-shaped areas of white space between the bounding boxes 420. Next, in step S343, the height and width of each horizontal primitive white area 430 is compared to a width threshold 440 and a height threshold 450, while the height and width of each vertical primitive white area 430 is compared to a width threshold 440' and a height threshold 450'.

The horizontal width threshold 440 is preferably set to one-third of the horizontal length of the document image 400. The horizontal height threshold 450 is set to a value greater than the line spacing of the text in the document image. The vertical height threshold 450' is preferably set to one-third of the vertical length of the document image 400. The vertical width threshold 440' is set to a value greater than the line spacing of the text in the document image. Primitive horizontal and vertical white areas having dimensions greater than the height (450, 450') thresholds and width (450, 450') thresholds are determined to be major white regions.

Then, in step S344, the horizontal primitive white areas 430 having widths smaller than the horizontal width threshold 440 and the vertical white areas 430 having heights smaller than the vertical height threshold 450' are eliminated. In step S345, the remaining primitive white areas 430 are grouped into the major white regions 460. Many possible methods for implementing the grouping of the remaining primitive white areas into major white regions are contemplated. One exemplary method is outlined in U.S. patent application Ser. No. 08/315,857, which provides a detailed disclosure of this exemplary method for grouping the remaining primitive white areas into major white regions.

Finally, in step S346, major white regions 460 are eliminated if at least one of their vertical or horizontal extents is less than the corresponding vertical or horizontal threshold. Alternately, only those major white regions 460 which have both their vertical and horizontal extents less than the corresponding thresholds are eliminated. Then, in step S347, control returns to step S350.

Figure 18:
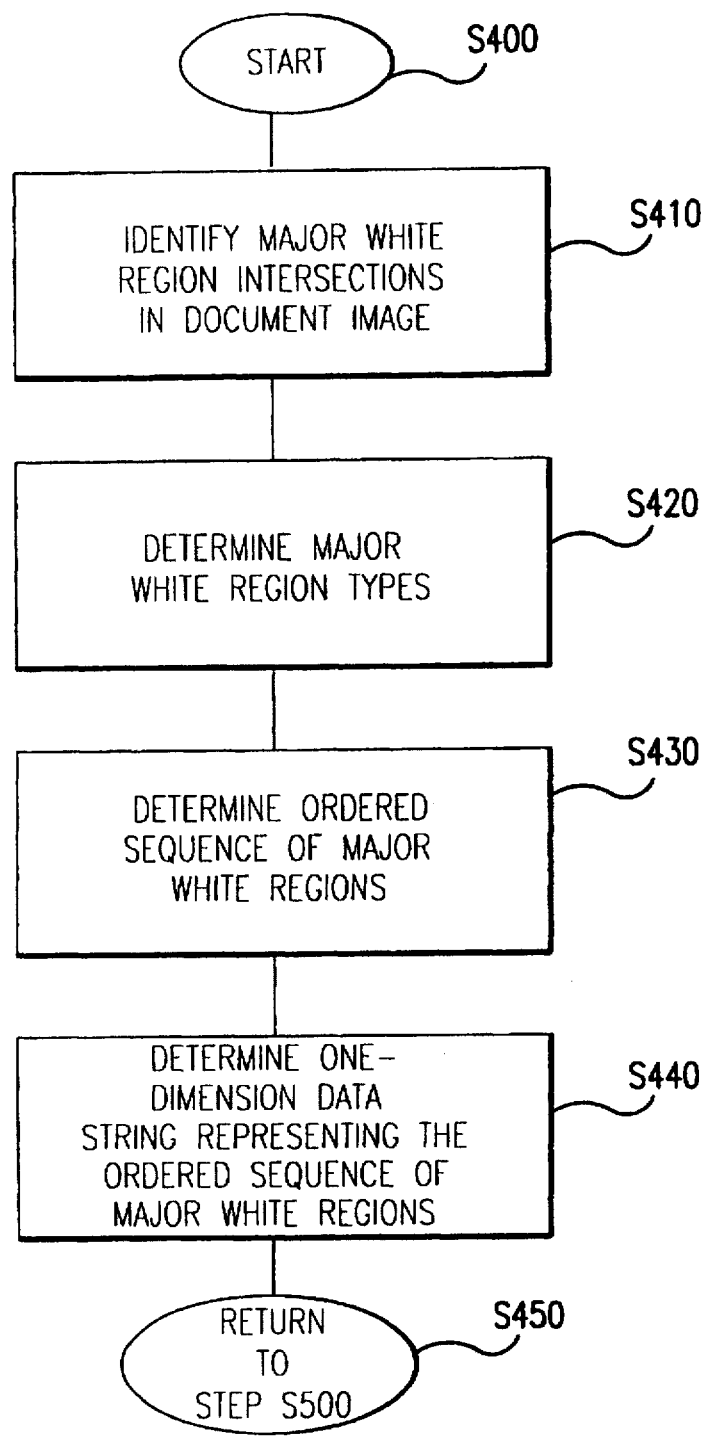
FIG. 18 is a flow chart outlining in detail one preferred embodiment of the step for generating the data string representation of the major white region of FIG. 15.

FIG. 18 outlines one preferred embodiment of step S400 for determining the one dimensional data string or column separator sequence for the major white regions extracted from the document image based on at least the major white region location and intersections. Starting from step 400, in step S410 the major white region intersections 480 in the document image 400 are identified. Then, in step S420, the major white region types are determined. In step S430, an ordered sequence of the determined types of the major white regions in the document image 400 is determined. In the preferred embodiment, the ordered sequence is determined moving initially from the top of the document image 400 to the bottom of the document image 400 and secondarily from the left to the right side of the document image 400. That is, when major white regions 460 have the same position relative to the top of the document image, the determining factor becomes the ordered location starting from the left vertical edge of the document image and proceeding to the right vertical edge of the document image. However, a horizontal major white region in the same relative position to the top of the document image takes precedence over a vertical major white regions. Then, the vertical major white regions are ordered left to right. In step S440, a one-dimensional data string representing the ordered sequence of the major white regions 460 in the document image 400 is determined. The one-dimensional data string in the preferred embodiment is based on the major white region type. Then, in step S450, control returns to step 500.

Figure 19:
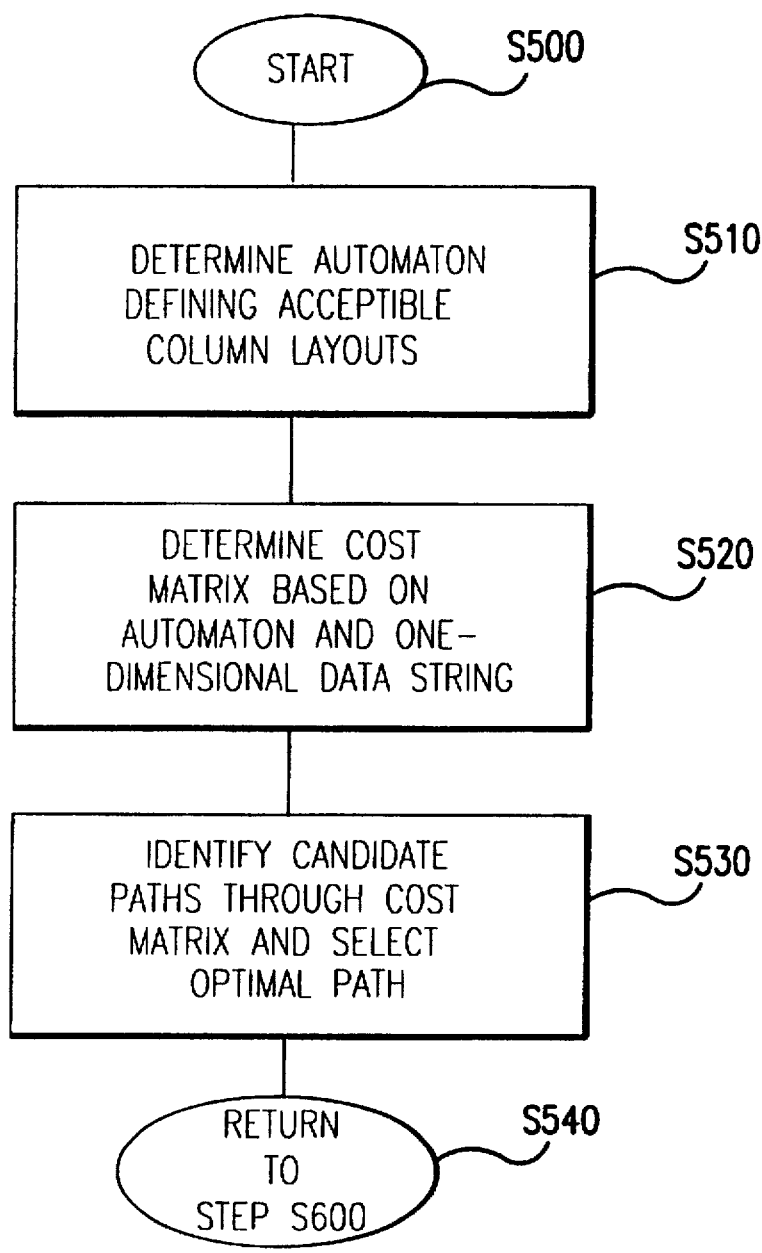
FIG. 19 is a flow chart outlining in detail one preferred embodiment of the step for processing the data string representation of FIG. 15.

FIG. 19 outlines one preferred embodiment of step S500, for comparing the one dimensional data string to a finite state machine or automaton to determine a cost matrix for each possible path dividing the document image into columns, and then identifying an optimal path from among the possible paths. Starting from step S500, in step S510, the finite state machine is determined or provided and defines the acceptable column layouts. The finite state machine is preferably supplied as a part of the structural model for the source document. In step S520, a cost matrix is determined based on the finite state machine and the one-dimensional data string for each path segmenting the document image using approximate relative expression matching. In step S530, the candidate paths through the cost matrix are evaluated and the optimal path is selected. The optimal path is selected based upon acceptable column layouts and the predetermined costs for insertions, deletions and substitutions to the possible paths to obtain a legal path having a total cost of zero through the document image. Then, in step S540, control returns to step S600.

Figure 20:
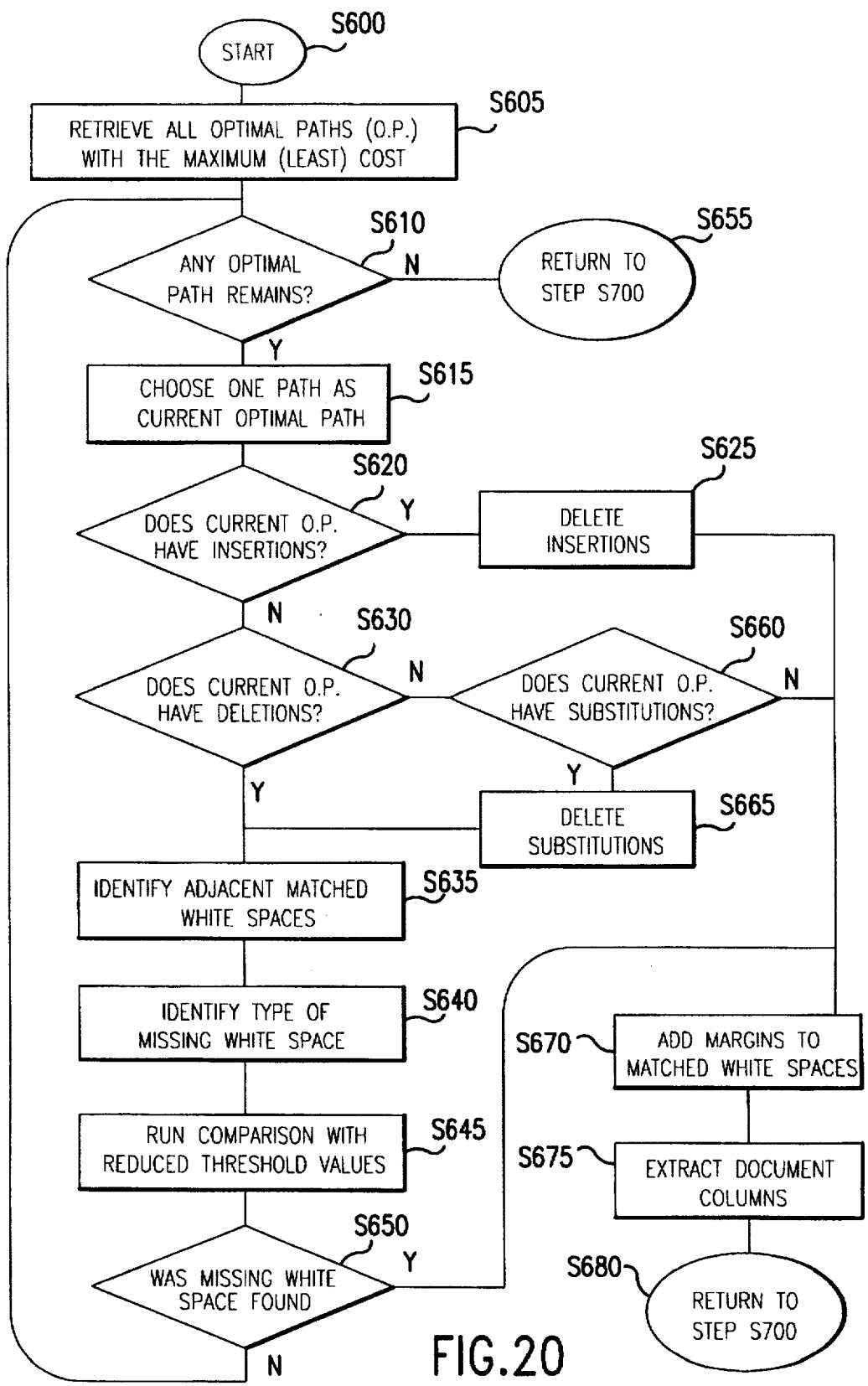
FIG. 20 is a flow chart outlining one preferred embodiment of the step of identifying the input document image column layout corresponding to the optimal path of the FIG. 15.

FIG. 20 outlines one preferred embodiment of step S600 for identifying the columnar layout of the document image from the optimal path. Starting from step S600, in step S605, all optimal paths with the maximum cost are retrieved. In step S610, the optimal paths are checked to see if any have not been evaluated. If all optimal paths have been evaluated and none remain, control continues to step S655. In step S655, control returns to step S700 and all optimal paths have been evaluated.

If optimal paths remain to evaluate, in step S610 control continues to Step 615 where one previously unevaluated path is chosen as a current optimal path. The control continues to step S620. In step S620, the current optimal path is checked for insertions, as shown in FIG. 21. If insertions are found, control continues to step S625, where the insertions are deleted. From step S625, control jumps directly to step S670. However, if in step S620 the current optimal path does not have insertions, control jumps to step S630.

In step S630, the current optimal path is checked for deletions as shown in FIG. 22. If no deletions are found in the current optimal path in step S630, control jumps to step S660. However, if in step S630 the current optimal path has deletions, control continues to step S635. In step S635, adjacent matched major white regions around the deletion are identified. In step S640, the type of the missing major white region is based on the identified adjacent matched major white regions. In step S645, the document white region extraction system 110 reprocesses the document image with reduced threshold values to locate and identify the missing major white region.

In step S650, the extracted major white regions are checked to determine the missing major white region was properly located. If, in step S650 the missing major white region is not determined to be properly located, control jumps back to step S610. If, in step S650, the missing major white region is determined to be properly located, control jumps to step S670.

In step S660, the current optimal path is checked for substitutions. If no substitutions are found, control jumps to step S670. If, in step S660, substitutions are found in the optimal path, control continues to step S665. In step S665, the substitutions are deleted, and control continues to step S635.

In step S670, the four margins, top, bottom, left side, and right side, are added back to the matched major white regions in the current optimal path. In step S675, the document elements separated by the major white regions in the optimal path are extracted into columns. Then, in step S680 control returns to step S700.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A method for logically identifying document elements in a complex column document image, comprising the steps of:

identifying major background regions in the document image;

generating an ordered data string corresponding to a type and a location of the major background regions in the document image;

comparing the ordered data string with a finite state machine to determine an optimal path from at least one candidate path for the ordered data string that best aligns with the finite state machine; and identifying a columnar layout based on the identified optimal path, wherein the step of identifying the columnar layout based on the identified optimal path comprises:

selecting a current candidate path from the at least one candidate path;

identifying editing costs in the current candidate path;

correcting the current candidate path, wherein correcting the current candidate path comprises:

deleting any insertions; inserting any deletions; and correcting any substitutions, wherein the step of inserting any deletions comprises:

identifying matched major background regions in the document image;

locating at least one missing major background region;

selecting adjacent matched major background regions for each of the at least one missing major background region;

determining a type of the at least one missing major background region based on the finite state machine;

searching the document image for the at least one missing major background region using reduced threshold values in the background regions identifying step;

adding the at least one missing major background region to the current candidate path if the at least one missing major background region is returned by the identifying major background regions step;

selecting a next candidate path if the at least one missing major background region is not found and making a next best optimal path the current optimal path and repeating the identifying matched major background regions step through the selecting a next candidate path step until each of the at least one candidate path has been evaluated; and setting the optimal path to the current candidate path if the at least one missing major background region is returned;

identifying major background regions based on the optimal path in the document image;

replacing four major background region margins around the major background regions based on the optimal path; and selecting closed loops of the major background regions to identify at least one column of document elements in the columnar layout of the document image.

2. A method for logically identifying document elements in a complex column document image, comprising the steps of:

identifying major background regions in the document image;

generating an ordered data string corresponding to a type and a location of the major background regions in the document image;

comparing the ordered data string with a finite state machine to determine an optimal path from at least one candidate path for the ordered data string that best aligns with the finite state machine; and identifying a columnar layout based on the identified optimal path, wherein the step of identifying the columnar layout based on the identified optimal path comprises:

selecting a current candidate path from the at least one candidate path;

identifying editing costs in the current candidate path;

correcting the current candidate path, wherein correcting the current candidate path comprises:

deleting any insertions; inserting any deletions; and correcting any substitutions wherein the step of deleting any insertions comprises:

identifying matched major background regions in the document image;

locating at least one extraneous major background region;

selecting adjacent matched major background regions for each of the at least one extraneous major background region;

determining a type of the at least one extraneous major background region based on the finite state machine;

deleting the at least one extraneous major background region from the current candidate path if the at least one extraneous major background region is located;

selecting a next current candidate path if the at least one extraneous major background region is not located and repeating the matched major background regions identifying step through the selecting a next current candidate path step until each of the at least one candidate path has been evaluated; and setting the optimal path to the current candidate path if each of the at least one extraneous major background regions in the current candidate path has been deleted;

identifying major background regions based an the optimal path in the document image;

replacing four major background region margins around the major background regions based on the optimal path; and selecting closed loops of the major background regions to identify at least one column of document elements in the columnar layout of the document image.

* * * * *